United States Patent
Chen et al.

(10) Patent No.: US 10,506,497 B2
(45) Date of Patent: Dec. 10, 2019

(54) SERVICE PROCESSING METHOD AND APPARATUS

(71) Applicant: Huawei Technologies Co., Ltd., Shenzhen (CN)

(72) Inventors: Ji Chen, Shenzhen (CN); Zhiming Ding, Shenzhen (CN); Gaokun Pang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 232 days.

(21) Appl. No.: 15/470,559

(22) Filed: Mar. 27, 2017

(65) Prior Publication Data
US 2017/0201930 A1 Jul. 13, 2017

Related U.S. Application Data

(63) Continuation of application No. PCT/CN2015/090894, filed on Sep. 28, 2015.

(30) Foreign Application Priority Data

Sep. 28, 2014 (CN) .......................... 2014 1 0510260

(51) Int. Cl.
*H04W 72/00* (2009.01)
*H04L 29/12* (2006.01)
(Continued)

(52) U.S. Cl.
CPC .......... *H04W 48/08* (2013.01); *H04L 61/103* (2013.01); *H04L 61/2007* (2013.01);
(Continued)

(58) Field of Classification Search
CPC ............... H04L 61/103; H04L 61/2007; H04L 61/2038; H04L 61/2092; H04L 61/6009;
(Continued)

(56) References Cited

U.S. PATENT DOCUMENTS

2004/0264451 A1 12/2004 Kujala et al.
2005/0083887 A1 4/2005 Lee et al.
(Continued)

FOREIGN PATENT DOCUMENTS

CN 1652630 A 8/2005
CN 100505657 C 6/2009
(Continued)

OTHER PUBLICATIONS

Gruteser et al., "Enhnacing Location Privacy in Wireless LAN Through Disposable Interface Identifiers: A Quantitative Analysis," XP001046685, pp. 46-55, ACM (Sep. 19, 2003).
(Continued)

*Primary Examiner* — Andrew Lai
*Assistant Examiner* — M Mostazir Rahman
(74) *Attorney, Agent, or Firm* — Leydig, Voit & Mayer, Ltd.

(57) ABSTRACT

The present invention discloses a service processing method and apparatus, which belong to the field of Internet technologies. After the AP and an STA first perform MAC address change notification and then establish a first MAC connection, the AP sends service data of the STA to the STA through the first MAC connection by using a resource related to a second MAC connection. Therefore, in a MAC address change process, there is no need to re-establish a resource at an upper layer of a MAC layer, and only a change in invoking a MAC layer resource is required at a layer at which the MAC layer resource is used. Time and a resource for processing a service can be reduced without affecting service continuity and stability of the upper layer. Therefore, the service is processed in a timely manner and service processing efficiency is improved.

13 Claims, 12 Drawing Sheets

(51) Int. Cl.
*H04W 48/08* (2009.01)
*H04W 8/26* (2009.01)
*H04W 40/02* (2009.01)
*H04W 48/20* (2009.01)

(52) U.S. Cl.
CPC ...... *H04L 61/2038* (2013.01); *H04L 61/2092* (2013.01); *H04L 61/6009* (2013.01); *H04L 61/6022* (2013.01); *H04W 8/26* (2013.01); *H04W 40/02* (2013.01); *H04W 48/20* (2013.01); *H04W 72/005* (2013.01)

(58) Field of Classification Search
CPC .. H04L 61/6022; H04W 40/02; H04W 48/08; H04W 48/20; H04W 72/005; H04W 8/26
See application file for complete search history.

(56) References Cited

U.S. PATENT DOCUMENTS

| | | | |
|---|---|---|---|
| 2007/0280207 A1 | 12/2007 | Shimizu et al. | |
| 2014/0064185 A1* | 3/2014 | Abraham | H04W 40/02 370/328 |
| 2015/0289299 A1* | 10/2015 | Abraham | H04L 12/4633 370/328 |
| 2017/0201930 A1 | 7/2017 | Chen et al. | |

FOREIGN PATENT DOCUMENTS

| | | |
|---|---|---|
| CN | 100548003 C | 10/2009 |
| CN | 101841880 B | 7/2012 |
| CN | 103200191 A | 7/2013 |
| CN | 103716860 A | 4/2014 |
| CN | 105530681 A | 4/2016 |
| EP | 2725766 A2 | 4/2014 |

OTHER PUBLICATIONS

Aura et al., "Securing Network Location Awareness with Authenticated DHCP," Third International Conference on Security and Privacy in Communications Networks and the Workshops, XP031276572A, Institute of Electrical and Electronics Engineers, New York, New York (Sep. 17-21, 2007).

* cited by examiner

SERVICE PROCESSING METHOD AND APPARATUS

CROSS-REFERENCE TO RELATED APPLICATIONS

This application is a continuation of International Application No. PCT/CN2015/090894, filed on Sep. 28, 2015, which claims priority to Chinese Patent Application No. 201410510260.3, filed on Sep. 28, 2014. The disclosures of the aforementioned applications are hereby incorporated by reference in their entireties.

TECHNICAL FIELD

The present invention relates to the field of Internet technologies, and in particular, to a service processing method and apparatus.

BACKGROUND

With development of current Internet technologies, more people use an STA (station) to connect to a wireless network covered by an AP (access point) so as to use different services. For example, a mobile phone is used for watching a movie or the like by accessing a wireless network covered by a wireless router. In this case, the access point needs to process the corresponding services. Because a MAC (media access control) address of the STA may change, how the access point processes the services when the MAC address of the STA changes is crucial to improving a service processing capability.

In a related technology, a service processing method is provided. In the method, each time a MAC address of an STA changes, an access point needs to establish a new MAC connection to the STA according to a changed MAC address of the STA, re-establish a resource at an upper layer of a MAC layer, and process a service by using the re-established resource at the upper layer of the MAC layer.

In a process of implementing the present invention, the inventor finds that at least the following problems exist in the foregoing method:

Each time the STA changes the MAC address, the access point needs to re-establish the resource at the upper layer of the MAC layer, and a process of re-establishing the resource at the upper layer of the MAC layer is relatively time- and resource-consuming. Therefore, service processing efficiency is low, and a service cannot be processed in a timely manner.

SUMMARY

To resolve problems in the prior art, embodiments of the present invention provide a service processing method and apparatus. The technical solution is as follows:

According to a first aspect, a service processing method is provided, where the method includes:

receiving, by an access point, a connection request that is sent by an STA by using a first MAC address; and establishing a first MAC connection to the STA according to the first MAC address, where the first MAC address is a MAC address after the STA changes a MAC address;

receiving a MAC address change message that is sent by the STA in an encryption mode, where the MAC address change message carries a second MAC address, and the second MAC address is a MAC address before the STA changes the MAC address;

determining, according to the MAC address change message, that the STA has changed the MAC address; and determining that a second MAC connection to the STA has been established by using the second MAC address; and sending service data of the STA to the STA through the first MAC connection by using a resource related to the second MAC connection.

With reference to the first aspect, in a first possible implementation manner of the first aspect, after the receiving a MAC address change message that is sent by the STA in an encryption mode, no new IP (Internet Protocol) address is assigned to the STA.

With reference to the first aspect, in a second possible implementation manner of the first aspect, the sending service data of the STA to the STA through the first MAC connection by using a resource related to the second MAC connection specifically includes:

sending the service data, which is sent to the STA originally through the second MAC connection, to the STA through the first MAC connection by using the resource related to the second MAC connection.

According to a second aspect, a service processing method is provided, where the method includes:

performing, by an access point and an STA, MAC address change notification in an encryption mode, where the access point and the STA have established a second MAC connection, the second MAC connection is established according to a second MAC address used by the STA, and the second MAC address is a MAC address before the STA changes a MAC address;

receiving a connection request that is sent by the STA by using a first MAC address, where the first MAC address is a MAC address after the STA changes the MAC address;

establishing a first MAC connection to the STA according to the first MAC address; and sending service data of the STA to the STA through the first MAC connection by using a resource related to the second MAC connection.

With reference to the second aspect, in a first possible implementation manner of the second aspect, the sending service data of the STA to the STA through the first MAC connection by using a resource related to the second MAC connection specifically includes:

sending the service data, which is sent to the STA originally through the second MAC connection, to the STA through the first MAC connection by using the resource related to the second MAC connection.

With reference to the second aspect, in a second possible implementation manner of the second aspect, the performing, by an access point and an STA, MAC address change notification in an encryption mode includes:

sending, by the access point to the STA in an encryption mode, a first notification message used to instruct the STA to change the MAC address, so that the STA changes the MAC address of the STA according to the first notification message.

With reference to the second aspect, in a third possible implementation manner of the second aspect, the performing, by an access point and an STA, MAC address change notification in an encryption mode includes:

receiving, by the access point, a second notification message that is sent by the STA in an encryption mode and used to notify the access point that the STA intends to change the MAC address, and determining, according to the second notification message, that the STA intends to change the MAC address.

With reference to any one of the second aspect to the third possible implementation manner of the second aspect, in a fourth possible implementation manner of the second aspect, the method further includes: after the connection request that is sent by the STA by using the first MAC address is received, assigning no new IP address to the STA.

According to a third aspect, a service processing apparatus is provided, where the apparatus includes:

a first receiving module, configured to receive a connection request that is sent by an STA by using a first MAC address, where the first MAC address is a MAC address after the STA changes a MAC address;

an establishment module, configured to establish a first MAC connection to the STA according to the first MAC address;

a second receiving module, configured to receive a MAC address change message that is sent by the STA in an encryption mode, where the MAC address change message carries a second MAC address, and the second MAC address is a MAC address before the STA changes the MAC address;

a determining module, configured to determine, according to the MAC address change message, that the STA has changed the MAC address; and determine that a second MAC connection to the STA has been established by using the second MAC address; and a sending module, configured to send service data of the STA to the STA through the first MAC connection by using a resource related to the second MAC connection.

With reference to the third aspect, in a first possible implementation manner of the third aspect, the apparatus further includes a processing module, configured to: after the second receiving module receives the MAC address change message that is sent by the STA in an encryption mode, assign no new IP address to the STA.

With reference to the third aspect, in a second possible implementation manner of the third aspect, the sending module is specifically configured to send the service data, which is sent to the STA originally through the second MAC connection, to the STA through the first MAC connection by using the resource related to the second MAC connection.

According to a fourth aspect, a service processing apparatus is provided, where the apparatus includes:

a notification module, configured to perform MAC address change notification with a station STA in an encryption mode, where the apparatus and the STA have established a second Media Access Control MAC connection, the second MAC connection is established according to a second MAC address used by the STA, and the second MAC address is a MAC address before the STA changes a MAC address;

a receiving module, configured to receive a connection request that is sent by the STA by using a first MAC address, where the first MAC address is a MAC address after the STA changes the MAC address; and an establishment module, configured to establish a first MAC connection to the STA according to the first MAC address; and a sending module, configured to send service data of the STA to the STA through the first MAC connection by using a resource related to the second MAC connection.

With reference to the fourth aspect, in a first possible implementation manner of the fourth aspect, the sending module is specifically configured to send the service data, which is sent to the STA originally through the second MAC connection, to the STA through the first MAC connection by using the resource related to the second MAC connection.

With reference to the fourth aspect, in a second possible implementation manner of the fourth aspect, the notification module is specifically configured to send, to the STA in an encryption mode, a first notification message used to instruct the STA to change the MAC address, so that the STA changes the MAC address of the STA according to the first notification message.

With reference to the fourth aspect, in a third possible implementation manner of the fourth aspect, the notification module is specifically configured to receive a second notification message that is sent by the STA in an encryption mode and used to notify the access point that the STA intends to change the MAC address; and determine, according to the second notification message, that the STA intends to change the MAC address.

With reference to any one of the fourth aspect to the third possible implementation manner of the fourth aspect, in a fourth possible implementation manner of the fourth aspect, the apparatus further includes a processing module, configured to: after the receiving module receives the connection request that is sent by the STA by using the first MAC address, assign no new IP address to the STA.

According to a fifth aspect, a service processing method is provided, where the method includes:

sending, by an STA, a connection request to an access point by using a first MAC address, where the first MAC address is a MAC address after the STA changes a MAC address;

establishing a first MAC connection to the access point according to the first MAC address;

sending a MAC address change message carrying a second MAC address to the access point in an encryption mode, where the second MAC address is a MAC address before the STA changes the MAC address, so that after the access point determines, according to the MAC address change message, that the STA has changed the MAC address, and determines that a second MAC connection to the STA has been established by using the second MAC address, the access point sends service data of the STA to the STA through the first MAC connection by using a resource related to the second MAC connection; and receiving, through the first MAC connection, the service data sent by the access point.

According to a sixth aspect, a service processing method is provided, where the method includes:

performing, by an STA and an access point, MAC address change notification in an encryption mode, where the STA and the access point have established a second MAC connection, the second MAC connection is established according to a second MAC address used by the STA, and the second MAC address is a MAC address before the STA changes a MAC address;

sending a connection request to the access point by using a first MAC address, where the first MAC address is a MAC address after the STA changes the MAC address;

establishing a first MAC connection to the access point according to the first MAC address, so that the access point sends service data of the STA to the STA through the first MAC connection by using a resource related to the second MAC connection; and receiving, through the first MAC connection, the service data sent by the access point.

With reference to the sixth aspect, in a first possible implementation manner of the sixth aspect, the performing, by an STA and an access point, MAC address change notification in an encryption mode includes:

receiving, by the STA, a first notification message that is sent by the access point in an encryption mode, where the first notification message is used to instruct the STA to change the MAC address; and changing, by the STA, the MAC address of the STA according to the first notification message.

With reference to the sixth aspect, in a second possible implementation manner of the sixth aspect, the performing, by an STA and an access point, MAC address change notification in an encryption mode includes:

sending, by the STA, a second notification message to the access point in an encryption mode, where the second notification message is used to notify the access point that the STA intends to change the MAC address, so that the access point determines, according to the second notification message, that the STA intends to change the MAC address.

According to a seventh aspect, a service processing apparatus is provided, where the apparatus includes:

a first sending module, configured to send a connection request to an access point by using a first MAC address, where the first MAC address is a MAC address after the apparatus changes a MAC address;

an establishment module, configured to establish a first MAC connection to the access point according to the first MAC address;

a second sending module, configured to send a MAC address change message carrying a second MAC address to the access point in an encryption mode, where the second MAC address is a MAC address before the apparatus changes the MAC address, so that after the access point determines, according to the MAC address change message, that the apparatus has changed the MAC address, and determines that a second MAC connection to the apparatus has been established by using the second MAC address, the access point sends service data of the apparatus to the apparatus through the first MAC connection by using a resource related to the second MAC connection; and a receiving module, configured to receive, through the first MAC connection, the service data sent by the access point.

According to an eighth aspect, a service processing apparatus is provided, where the apparatus includes:

a notification module, configured to perform MAC address change notification with an access point in an encryption mode, where the apparatus and the access point have established a second MAC connection, the second MAC connection is established according to a second MAC address used by the apparatus, and the second MAC address is a MAC address before the apparatus changes a MAC address;

a sending module, configured to send a connection request to the access point by using a first MAC address, where the first MAC address is a MAC address after the apparatus changes the MAC address;

an establishment module, configured to establish a first MAC connection to the access point according to the first MAC address, so that the access point sends service data of the apparatus to the apparatus through the first MAC connection by using a resource related to the second MAC connection; and a receiving module, configured to receive, through the first MAC connection, the service data sent by the access point.

With reference to the eighth aspect, in a first possible implementation manner of the eighth aspect, the notification module is specifically configured to receive a first notification message that is sent by the access point in an encryption mode, where the first notification message is used to instruct the apparatus to change the MAC address; and change the MAC address of the apparatus according to the first notification message.

With reference to the eighth aspect, in a second possible implementation manner of the eighth aspect, the notification module is specifically configured to send a second notification message to the access point in an encryption mode, so that the access point determines, according to the second notification message, that the apparatus intends to change the MAC address.

The technical solution provided in the embodiments of the present invention brings the following beneficial effects:

After establishing a first MAC connection, an access point and an STA perform MAC address change notification, so that after determining that the access point and the STA have established a second MAC connection, the access point sends service data of the STA to the STA through the first MAC connection by using a resource related to the second MAC connection; or after an access point and an STA, which have established a second MAC connection, first perform MAC address change notification and then establish a first MAC connection, the access point sends service data of the STA to the STA through the first MAC connection by using a resource related to the second MAC connection. Therefore, in a MAC address change process, there is no need to re-establish a resource at an upper layer of a MAC layer. Time and a resource for processing a service can be reduced without affecting service continuity and stability of the upper layer. Therefore, the service is processed in a timely manner and service processing efficiency is improved.

BRIEF DESCRIPTION OF DRAWINGS

To describe the technical solutions in the embodiments of the present invention more clearly, the following briefly describes the accompanying drawings for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

Example embodiments are described in detail herein, and examples of the example embodiments are presented in the accompanying drawings. When the following description relates to the accompanying drawings, unless specified otherwise, same numbers in different accompanying drawings represent a same or similar element. Implementation manners described in the following example embodiments do not represent all implementation manners consistent with the present invention. On the contrary, they are only examples of apparatuses and methods that are described in the appended claims in details and that are consistent with some aspects of the present invention.

When a service is processed in a related technology, if a MAC address of an STA changes, in this case, a new MAC connection to the STA needs to be established according to a changed MAC address of the STA, a resource at an upper layer of a MAC layer needs to be re-established, and the service is processed by using the re-established resource at the upper layer of the MAC layer. Therefore, each time the STA changes the MAC address, the resource at the upper layer of the MAC layer needs to be re-established. A process of re-establishing the resource at the upper layer of the MAC layer is relatively time- and resource-consuming, which leads to low service processing efficiency.

Figure 1:
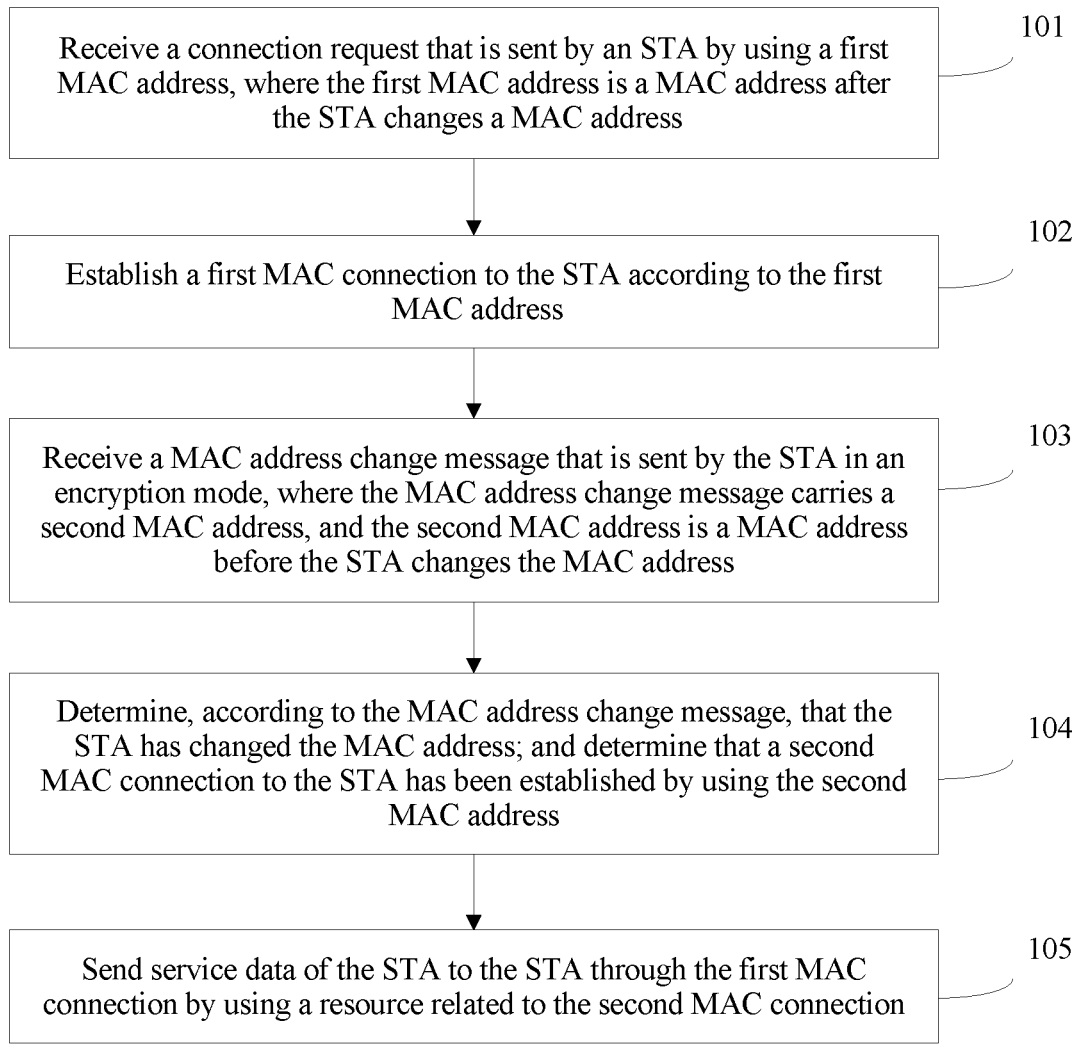
FIG. 1 is a flowchart of a service processing method according to an embodiment of the present invention.

To prevent the foregoing situation and improve service processing efficiency, an embodiment of the present invention provides a service processing method, and the method is applied to an access point. The access point in this embodiment and a subsequent embodiment includes but is not limited to a wireless router, a wireless switch, or the like. A specific product form of the access point is not limited in this embodiment and the subsequent embodiment. In addition, the method further relates to an STA. The STA in this embodiment and the subsequent embodiment includes but is not limited to a computer with a wireless network interface card, a mobile phone with a WiFi (Wireless-Fidelity) module, or the like. A specific product form of the STA is not limited in this embodiment and the subsequent embodiment. Referring to FIG. 1, a procedure of the method provided by this embodiment includes the following steps:

101. Receive a connection request that is sent by the STA by using a first MAC address, where the first MAC address is a MAC address after the STA changes a MAC address.

102. Establish a first MAC connection to the STA according to the first MAC address.

103. Receive a MAC address change message that is sent by the STA in an encryption mode, where the MAC address change message carries a second MAC address, and the second MAC address is a MAC address before the STA changes the MAC address.

In an optional embodiment, after the MAC address change message sent by the STA in an encryption mode is received, no new IP address is assigned to the STA.

104. Determine, according to the MAC address change message, that the STA has changed the MAC address; and determine that a second MAC connection to the STA has been established by using the second MAC address.

105. Send service data of the STA to the STA through the first MAC connection by using a resource related to the second MAC connection.

In the method provided by this embodiment, after establishing a first MAC connection, an access point and an STA perform MAC address change notification, so that after determining that the access point and the STA have established a second MAC connection, the access point sends service data of the STA to the STA through the first MAC connection by using a resource related to the second MAC connection.

In a computer network hierarchical structure model described according to an OSI (Open System Interconnection), a computer network hierarchical structure is divided into seven layers, which are successively an application layer, a presentation layer, a session layer, a transport layer, a network layer, a data link layer, and a physical layer from top to bottom. The transport layer includes TCP (Transmission Control Protocol), User Datagram Protocol (UDP), and the like. The network layer is an IP layer. A lower layer always provides a service for an upper layer, and the upper layer always uses the service provided by the lower layer. To complete transmission of a service of the application layer, on a transmit end, data needs to be processed at each layer from top to bottom, and when the data arrives at the physical layer, the data is transmitted to a receive end by means of interaction over a physical channel. On the receive end, the data needs to be processed at each layer from bottom to top, and the data is finally extracted and used at an application layer of the receive end. Some resources need to be assigned to process this service at each layer. Inside a device system, these resources may be hardware or logical resources such as a related processing time, storage space, and a processing program that are indexed according to a resource number. These resources may be created when the service is established, and canceled when the service is finished. A MAC layer involved in this embodiment belongs to a sublayer of the data link layer. In a service existence process, each layer has a resource assigned to this service, such as an application layer resource, a presentation layer resource, a session layer resource, a transport layer resource, a network layer resource, a MAC layer resource, or a physical layer resource. The resource related to the second MAC connection involved in this embodiment and a subsequent embodiment includes but is not limited to a resource at an upper layer of the MAC layer. The resource related to the second MAC connection is not limited in this embodiment and the subsequent embodiment. In this embodiment, in the service existence process, a change of the MAC address leads to resource re-assignment at the MAC layer. However, a resource above the MAC layer is affected as less as possible by means of internal processing of a device. For example, only in the network layer resource, a change from invoking an old MAC layer resource to invoking a new MAC layer resource is made, and another resource is not affected. Alternatively, a processing module is added between the network layer resource and the MAC layer resource. The network layer resource re-uses the MAC layer resource by using the processing module. Therefore, after the MAC layer resource changes, a change in invoking the MAC layer resource is implemented by the processing module, thereby avoiding affecting the network layer resource and various resources above the network layer.

Impact, of the foregoing internal processing, on external performance of the device is as follows: On a basis that there is already a MAC connection between the STA and the access point, in a process of re-establishing a MAC connection, the access point does not need to assign an IP address to the STA as the original MAC connection is established, and there is also no DHCP (Dynamic Host Configuration Protocol)-related message for assigning the IP address in message exchange. By means of the foregoing processing, the resource at the upper layer of the MAC layer does not need to be re-established in a MAC address change process, and invoking the MAC layer resource only needs to be changed at a layer at which the MAC layer resource is used. (In this embodiment, after the MAC address is changed, a changed MAC connection, namely the first MAC connection, is used, and the resource, related to the second MAC connection, established before the change is invoked to transmit the service data.) Time and a resource for processing a service can be reduced without affecting service continuity and stability of the upper layer. Therefore, the service is processed in a timely manner and service processing efficiency is improved.

Figure 2:
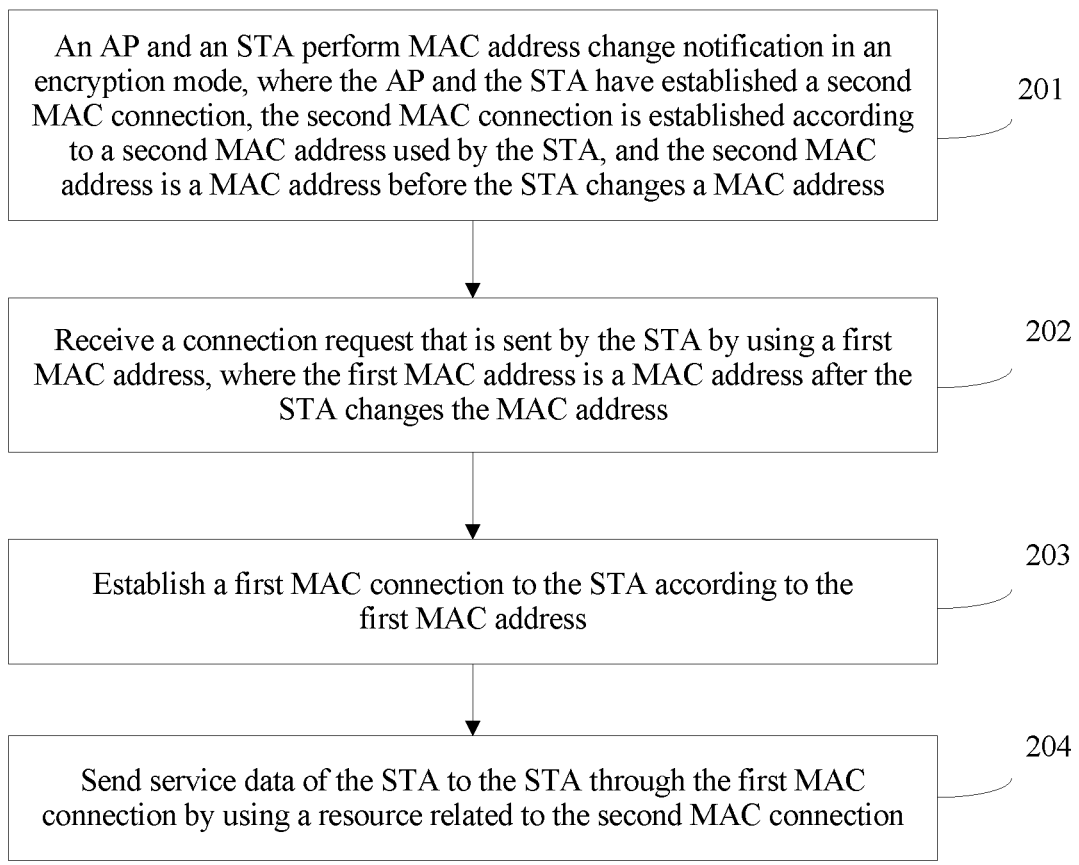
FIG. 2 is a flowchart of a service processing method according to another embodiment of the present invention.

An embodiment of the present invention provides a service processing method, and the method is applied to an access point and involves an STA. Referring to FIG. 2, a procedure of the method provided by this embodiment includes the following steps.

201. The access point and the STA perform MAC address change notification in an encryption mode, where the access point and the STA have established a second MAC connection, the second MAC connection is established according to a second MAC address used by the STA, and the second MAC address is a MAC address before the STA changes a MAC address.

In an optional embodiment, that the access point and the STA perform MAC address change notification in an encryption mode includes:

sending, by the access point to the STA in an encryption mode, a first notification message used to instruct the STA to change the MAC address, so that the STA changes the MAC address of the STA according to the first notification message.

In an optional embodiment, that the access point and the STA perform MAC address change notification in an encryption mode includes:

receiving, by the access point, a second notification message that is sent by the STA in an encryption mode and used to notify the access point that the STA intends to change the MAC address, and determining, according to the second notification message, that the STA intends to change the MAC address.

202. Receive a connection request that is sent by the STA by using a first MAC address, where the first MAC address is a MAC address after the STA changes the MAC address.

203. Establish a first MAC connection to the STA according to the first MAC address.

In an optional embodiment, the method further includes: after the connection request that is sent by the STA by using the first MAC address is received, assigning no new IP address to the STA.

204. Send service data of the STA to the STA through the first MAC connection by using a resource related to the second MAC connection.

In an optional embodiment, the sending service data of the STA to the STA through the first MAC connection by using a resource related to the second MAC connection specifically includes:

sending the service data, which is sent to the STA originally through the second MAC connection, to the STA through the first MAC connection by using the resource related to the second MAC connection.

In the method provided by this embodiment, after an access point and an STA, which have established a second MAC connection, first perform MAC address change notification and then establish a first MAC connection, the access point sends service data of the STA to the STA through the first MAC connection by using a resource related to the second MAC connection. Therefore, in a MAC address change process, there is no need to re-establish a resource at an upper layer of a MAC layer. Time and a resource for processing a service can be reduced without affecting service continuity and stability of the upper layer. Therefore, the service is processed in a timely manner and service processing efficiency is improved.

Figure 3:
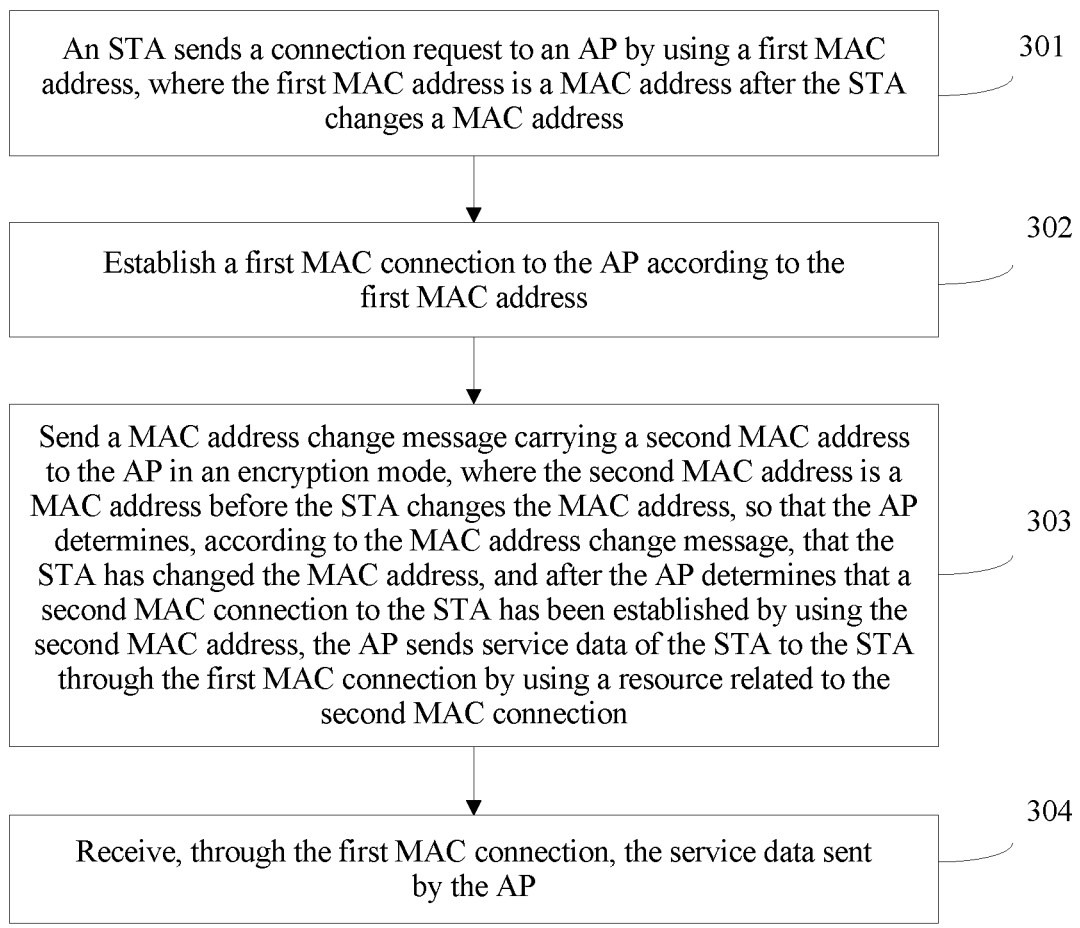
FIG. 3 is a flowchart of a service processing method according to another embodiment of the present invention.

An embodiment of the present invention provides a service processing method, and the method is applied to an STA and involves an access point. With reference to content of the foregoing embodiment corresponding to FIG. 1, referring to FIG. 3, a procedure of the method provided by this embodiment includes the following steps:

301. The STA sends a connection request to the access point by using a first MAC address, where the first MAC address is a MAC address after the STA changes a MAC address.

302. Establish a first MAC connection to the access point according to the first MAC address.

303. Send a MAC address change message carrying a second MAC address to the access point in an encryption mode, where the second MAC address is a MAC address before the STA changes the MAC address, so that after the access point determines, according to the MAC address change message, that the STA has changed the MAC address, and determines that a second MAC connection to the STA has been established by using the second MAC address, the access point sends service data of the STA to the STA through the first MAC connection by using a resource related to the second MAC connection.

304. Receive, through the first MAC connection, the service data sent by the access point.

In the method provided by this embodiment, after establishing a first MAC connection, an access point and an STA perform MAC address change notification, so that after determining that the access point and the STA have established a second MAC connection, the access point sends service data of the STA to the STA through the first MAC connection by using a resource related to the second MAC connection. Therefore, in a MAC address change process, there is no need to re-establish a resource at an upper layer of a MAC layer. Time and a resource for processing a service can be reduced without affecting service continuity and stability of the upper layer. Therefore, the service is processed in a timely manner and service processing efficiency is improved.

Figure 4:
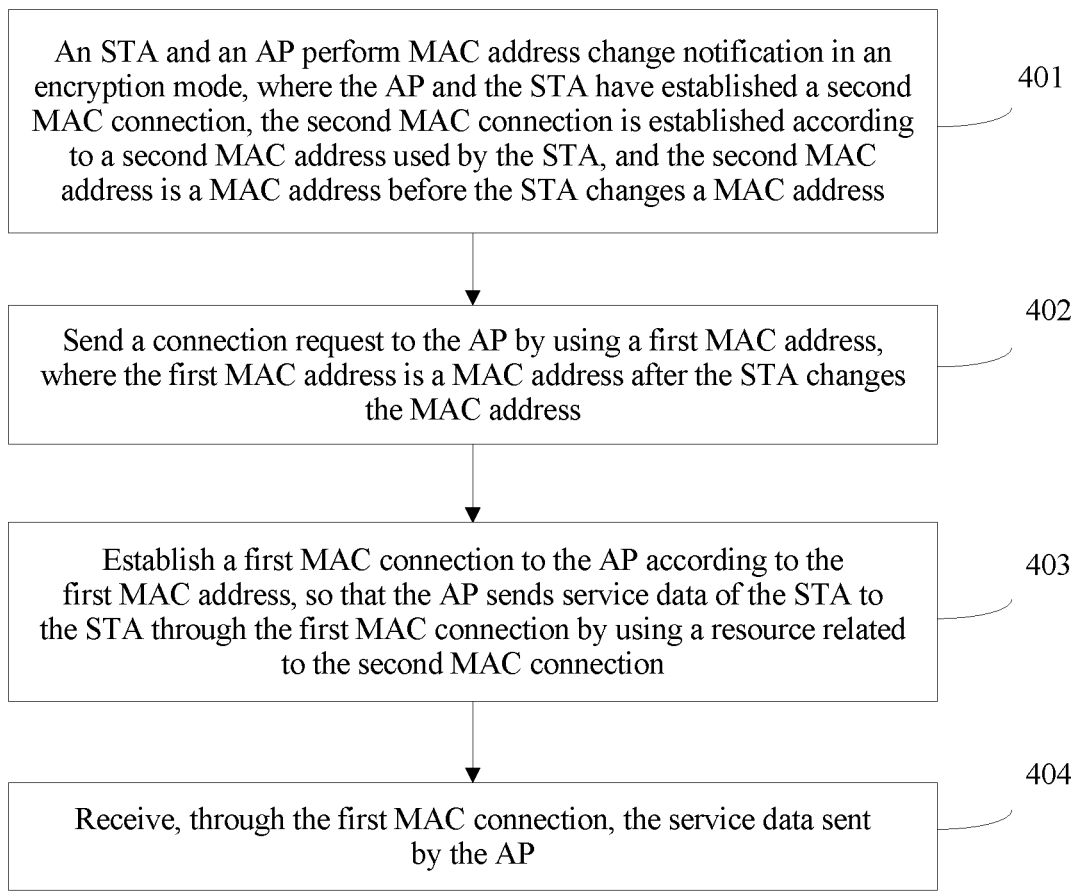
FIG. 4 is a flowchart of a service processing method according to another embodiment of the present invention.

An embodiment of the present invention provides a service processing method, and the method is applied to an STA and involves an access point. With reference to content of the foregoing embodiment corresponding to FIG. 2, referring to FIG. 4, a procedure of the method provided by this embodiment includes the following steps.

401. The STA and the access point perform MAC address change notification in an encryption mode, where the STA and the access point have established a second MAC connection, the second MAC connection is established according to a second MAC address used by the STA, and the second MAC address is a MAC address before the STA changes a MAC address.

The STA and the access point perform MAC address change notification, so as to change the MAC address used by the STA from the second MAC address to a first MAC address.

A notification process may be that the STA sends a MAC address change notification message to the access point in an encryption mode. The MAC address change notification message may include but is not limited to the first MAC address, so that the access point is notified that the STA sending the MAC address change notification message intends to change the MAC address from the second MAC address to the first MAC address. Therefore, the access point determines, according to the MAC address change notification message, that the STA intends to change the MAC address. Further optionally, the access point may return an acknowledgment message to the STA according to the MAC address change notification message. The acknowledgment message may indicate that the access point allows the STA to change the MAC address, so that the STA changes the MAC address after receiving the acknowledgment message. Specifically, the MAC address change notification message may be a MAC address change request message used to request to change a MAC address, and the acknowledgment message may be a MAC address change response message.

The notification process may also be that the access point sends a MAC address change notification message to the STA in an encryption mode. The MAC address change notification message is used to instruct the STA to change the MAC address. The STA receives the MAC address change notification message that is sent by the access point in an encryption mode, and changes the MAC address of the STA according to the MAC address change notification message. In this way, the STA and the access point may continue a subsequent procedure after the MAC address is changed.

In addition, for ease of differentiation, the MAC address change notification message that is sent to the access point by the STA in an encryption mode is used as a first notification message, and the MAC address change notification message that is sent to the STA by the access point in an encryption mode is used as a second notification message. Certainly, the notification process may also be performed in another manner, and is not limited to the foregoing manners.

402. Send a connection request to the access point by using a first MAC address, where the first MAC address is a MAC address after the STA changes the MAC address.

403. Establish a first MAC connection to the access point according to the first MAC address, so that the access point sends service data of the STA to the STA through the first MAC connection by using a resource related to the second MAC connection.

404. Receive, through the first MAC connection, the service data sent by the access point.

In the method provided by this embodiment, after an access point and an STA, which have established a second MAC connection, first perform MAC address change notification and then establish a first MAC connection, the access point sends service data of the STA to the STA through the first MAC connection by using a resource related to the second MAC connection. Therefore, in a MAC address change process, there is no need to re-establish a resource at an upper layer of a MAC layer. Time and a resource for processing a service can be reduced without affecting service continuity and stability of the upper layer. Therefore, the service is processed in a timely manner and service processing efficiency is improved.

Figure 5:
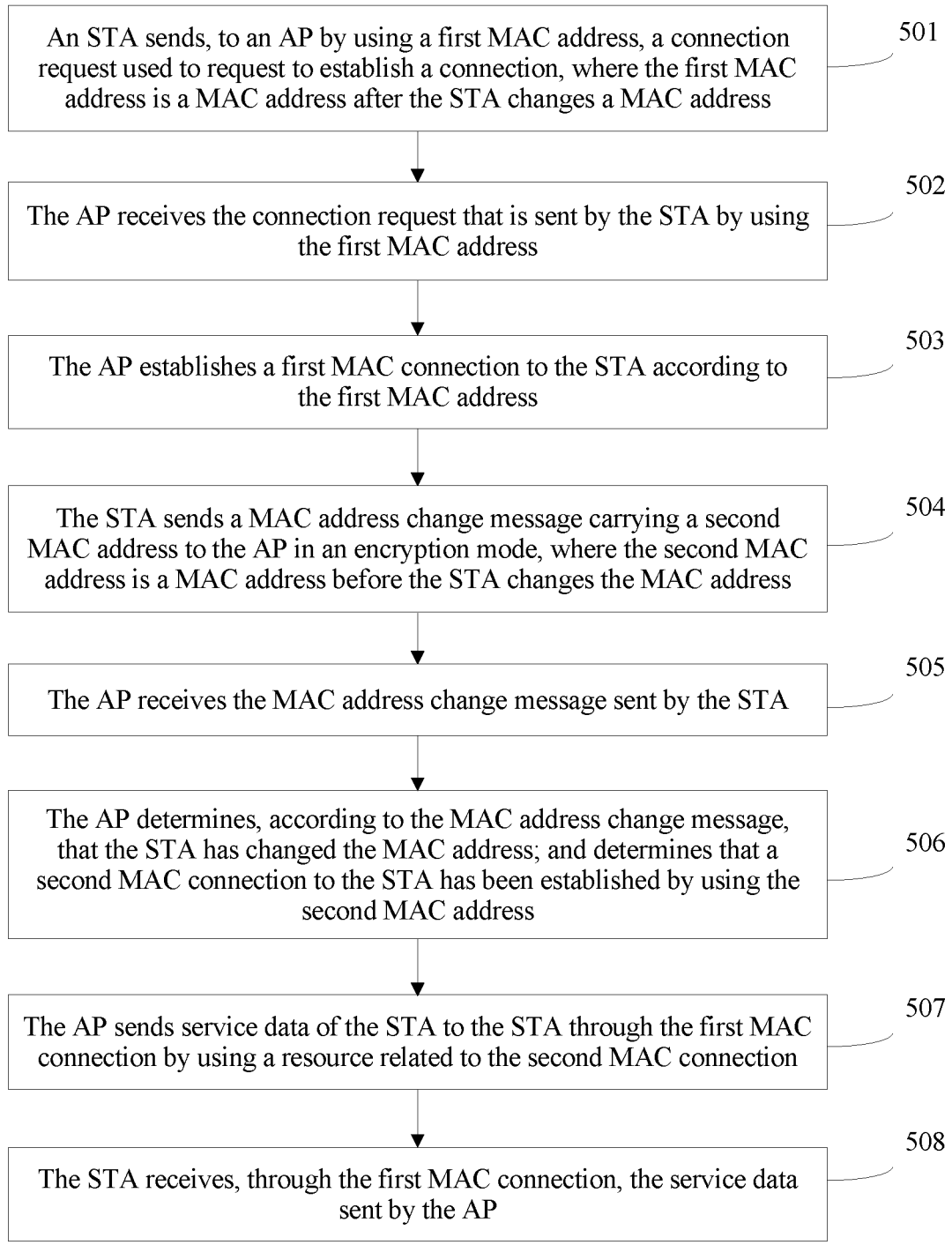
FIG. 5 is a flowchart of a service processing method according to another embodiment of the present invention.

An embodiment of the present invention provides a service processing method, and the method involves an STA and an access point. With reference to content of the foregoing embodiments, in an example of this embodiment, the STA triggers a MAC address change, and the access point and the STA are associated first and then conduct a MAC address change negotiation, to illustrate the method provided by this embodiment. Referring to FIG. 5, a procedure of the method provided by this embodiment includes the following steps.

501. The STA sends, to the access point by using a first MAC address, a connection request used to request to establish a connection, where the first MAC address is a MAC address after the STA changes a MAC address.

The STA needs to connect to a wireless network by using the access point, so as to access a network resource. For example, a mobile phone with a WiFi module can access the Internet by using a wireless router that has an access point function. Before that, the STA and the access point need to connect to each other first. A connection step includes establishing an association, mutually authenticating an identity of each other, and negotiating a key used to encrypt data in a process of communication between the two parties. The current step is that the STA sends the connection request to the access point, where the connection request may be an association request, representing an intention of the STA to associate with the access point. That is, the association request is the beginning of establishing the connection between the STA and the access point. A form of the connection request sent by the STA by using the first MAC address may be a connection request frame, or another message that has a similar function, which is not specifically limited in this embodiment.

502. The access point receives the connection request that is sent by the STA by using the first MAC address.

The connection request sent by the STA may be an association request. A manner of receiving, by the access point, the association request that is sent by the STA by using the first MAC address is not limited in this embodiment, and includes but is not limited to receiving the association request according to a manner of sending the association request by the STA. For example, when the STA sends the association request in a form of an association request frame, the access point can receive the association request frame sent by the STA, which is not specifically limited in this embodiment.

It should be noted that, because the STA uses the first MAC address to send the association request, after the access point receives the association request sent by the STA, the access point can obtain the first MAC address of the STA at the same time, to establish a MAC connection to the STA subsequently, which is not specifically limited in this embodiment.

503. The access point establishes a first MAC connection to the STA according to the first MAC address.

It can be learned from the foregoing step 502 that, after receiving the association request sent by the STA, the access point can associate with the STA according to the association request. A manner of associating with the STA by the access point according to the association request is not limited in this embodiment, and includes but is not limited to the following: The access point sends an association response frame to the STA by using the first MAC address as a destination address. The association response frame can represent an intention that the access point agrees with an association. After the access point sends the association response frame representing an agreement to the association, the access point and the STA establish an association relationship.

The association request may carry capability information of the STA, which is not specifically limited in this embodiment. After receiving the association request sent by the STA, the access point may detect a capability of the STA according to the capability information of the STA carried in the association request, so as to determine the capability of the STA. If the capability of the STA reaches a preset standard, the access point establishes a wireless data link with the STA, and determines that the access point is successfully associated with the STA.

Detection of the capability of the STA may include detecting a radio frequency mode of a WLAN (Wireless Local Area Network) supported by the STA, detecting whether the STA supports WMM (Wi-Fi MultiMedia), or the like. Certainly, the detection of the capability supported by the STA may further include another item, which is not specifically limited in this embodiment. Correspondingly, there also may be a different corresponding preset standard, which is not specifically limited in this embodiment. For example, if the radio frequency mode of the WLAN supported by the STA meets several preset radio frequency modes, it can be determined that the capability of the STA meets the standard. After determining that the access point is successfully associated with the STA, the access point may further return association response information to the STA for the purpose of notifying the STA of an association result. The association response information is used to notify the STA whether the association succeeds. A form of the association response may also be a form of a data frame, such as an association response frame, which is not specifically limited in this embodiment.

After the access point is successfully associated with the STA, the access point may continue to establish the first MAC connection to the STA according to the first MAC address. A subsequent process includes a process of mutually authenticating the identity of each other and negotiating a key used for communication by the access point and the STA. The process of authenticating the identity and negotiating the key used for communication may be completed by using the 4-way handshake in Standard IEEE802.11. After the process of authenticating the identity and negotiating the key used for communication is completed, the MAC connection between the two parties is established. The key negotiated herein may be used for encryption in subsequent MAC layer data transmission of the two parties.

To reduce network complexity and simplify a complex network problem to rapidly locate and rectify a network fault, when data is transmitted between the STA and the access point, a network on each end is logically divided into several layers. Data of the highest layer needs to be encapsulated at each layer from the top layer to the bottom layer, and after the data reaches the lowest layer, the data is transmitted in the network by using a physical transmission medium. For example, in a TCP/IP (Transmission Control Protocol/Internet Protocol) network reference model, a network is divided into five layers, which are respectively a physical layer, a data link layer, a network layer, a transport layer, and an application layer from bottom to top. Application data of the highest layer, the application layer, is encapsulated into a packet at the transport layer by adding header control information of the transport layer, the packet at the transport layer is encapsulated into a data packet at the network layer by adding header control information of the network layer, the data packet at the network layer is encapsulated into a data frame at the data link layer by adding header control information of the data link layer, and the data frame at the data link layer is converted into a bit stream at the physical layer and transmitted in the network by using an actual physical transmission medium.

Any two neighboring layers in the foregoing several layers obtained by dividing the network on the STA end or the access point end mutually reserve interfaces for each other, and each layer works independently and transparently. For example, two neighboring layers, the network layer and the data link layer on the STA end, only mutually reserve interfaces for transferring data. How the data link layer works and transmits data is transparent to the network layer, and has no impact on work of the network layer. Correspondingly, how the network layer works and transmits data is also transparent to the data link layer and also has no impact on the work of the data link layer. A same principle is applicable to the network layer and the data link layer of the access point. Therefore, when the STA sends data to the access point, between any two same layers in the STA and the access point, the data is equivalently transmitted directly through a logical connection. For example, for the data link layer of the STA and the data link layer of the access point, because the data link layer of the STA is transparent to upper and lower layers of the data link layer of the STA, and the data link layer of the access point is also transparent to upper and lower layers of the data link layer of the access point, a connection between the data link layer of the STA and the data link layer of the access point is directly established equivalently, and a data frame is transmitted through the data link layer connection established between the two ends. It can be learned from the foregoing principle that, after the STA is successfully associated with the access point, because a wireless data link has been established in this case, a connection between any same layers on the STA end and the access point end is also established equivalently. The established connection includes a connection between the data link layers, and the data link layer is a MAC layer, that is, a MAC connection between the STA and the access point is established. In addition, because the MAC connection needs to be established and maintained according to MAC addresses of the two ends, when the STA is successfully associated with the access point, the access point can establish the first MAC connection to the STA according to the first MAC address of the STA.

504. The STA sends a MAC address change message carrying a second MAC address to the access point in an encryption mode, where the second MAC address is a MAC address before the STA changes the MAC address.

After the STA is successfully associated with the access point and establishes the first MAC connection by performing the foregoing steps 501 to 503, because the first MAC address of the STA may be a changed MAC address of the STA, when the first MAC address is the changed MAC address, the STA using the changed MAC address to initiate an association request is equivalent to a new STA from a perspective of the access point, that is, the access point considers that the STA has never sent an association request before. In this case, according to a normal processing procedure of the access point, an IP address needs to be assigned to the STA according to DHCP (Dynamic Host Configuration Protocol). However, because only the MAC address of the STA is changed, the STA only needs to notify the access point that the STA has previously established a MAC connection to the access point, and now changes only the MAC address. The access point only needs to change a MAC layer resource for the STA and switch invoking of the MAC layer resource by an upper layer resource above the MAC layer resource. A purpose that the STA sends the MAC address change message carrying the second MAC address to the access point in an encryption mode is to notify the access point that the STA has originally established the MAC connection to the access point by using the second MAC address, and now the second MAC address has been changed to the first MAC address. When the first MAC address is used to establish a MAC layer connection to the access point, the access point does not need to allocate the resource at the upper layer of the MAC layer, including assigning a new IP address to the STA. Encryption described herein may be that, after the first MAC connection is established, encryption is performed by using a key negotiated in a process of establishing the first MAC connection, which is not specifically limited in this embodiment. In addition, because the STA changes only the MAC address, when the access point processes a service, configuration at the upper layer of the MAC layer may not change. For example, an IP address assigned to the STA before the STA changes the MAC address, related configuration at the network layer, and the like may not change. However, for the access point, the STA using the changed MAC address to initiate the association request is equivalent to a new STA, and the access point needs to reconfigure a related resource for processing a service of the STA, which is relatively time- and resource-consuming. Therefore, the STA sends the MAC address change message carrying the second MAC address to the access point in an encryption mode, and the access point can learn that the STA initiating the association request this time is not a new STA but an STA that the access point has previously associated with and processed a service for. Therefore, the access point can use a related resource that had been previously assigned to continue to process the service of the STA. MAC address change information may carry the second MAC address, and the second MAC address is the MAC address before the STA changes the MAC address.

Because the STA needs to change the MAC address at the MAC layer, namely the data link layer, according to the foregoing related principle for division of network layers, a manner of sending, by the STA, the MAC address change message may include but is not limited to the following two sending manners:

Sending manner 1: An existing MAC layer data frame is modified or a new MAC layer data frame is added, so as to carry the MAC address change message, where the MAC address change message may be sent together with the MAC layer data frame.

For example, when a data packet is encapsulated into a data frame at the MAC layer, MAC address change indication information is added to MAC layer header control information that needs to be added to the data frame originally. The MAC address change indication information is used to indicate that the STA changes only the MAC address and carries the second MAC address of the STA. The MAC address change message may be sent together with the data frame. The header control information in the encapsulated data frame may be modified, so as to add the MAC address change indication information. Alternatively, when a new data frame is encapsulated, the MAC address change indication information may be added to header control information of the new data frame, which is not specifically limited in this embodiment.

Sending manner 2: Protocol content of DHCP is modified to send the MAC address change message.

It can be learned from the foregoing process of assigning the IP address that, when the IP address is assigned according to DHCP, the STA needs to send a message to the access point. Therefore, the MAC address change indication information may be added to the message sent by the STA.

For example, when the STA broadcasts a DHCP Discovery message in a network, MAC address change indication information may be added to the DHCP Discovery message, is used to indicate that the STA changes only a MAC address, and carries a MAC address before the STA changes the MAC address. A MAC address change message may be sent together with the DHCP Discovery message.

It should be noted that, a physical location of a user using the STA can be tracked by using a MAC address, or service content of a user using the STA may be learned by tracking data of the STA. Because the foregoing information belongs to private information, to protect user privacy, when the STA sends a MAC address change message, the STA may send the MAC address change message in an encryption mode, which is not specifically limited in this embodiment. A symmetric key or an asymmetric key may be used for encryption in the encryption mode. A specific encryption mode is not limited in this embodiment. In addition, because a subsequent step may further involve information exchange between the STA and the access point, when the STA and the access point exchange information in the subsequent step, the key in this step or another key may be used for encryption, so as to protect user privacy.

505. The access point receives the MAC address change message sent by the STA.

A manner of receiving, by the access point, the MAC address change message sent by the STA is not specifically limited in this embodiment. For a specific process, reference may be made to the manners of sending the MAC address change message to the access point by the STA in the foregoing step 504. For example, when the STA sends the MAC address change message to the access point in a form of a data frame, the access point can receive the data frame sent by the STA, which is not specifically limited in this embodiment.

In addition, after receiving the MAC address change message sent by the STA, the access point may return a MAC address change response message to the STA. The MAC address change response message is used to notify the STA that the access point has learned that the MAC address of the STA is a changed MAC address, that is, the second MAC address is a MAC address before the MAC address is changed, and the first MAC address is a MAC address after the MAC address is changed, which is not specifically limited in this embodiment.

It should be noted that, because the MAC address change message is sent by being attached to a data frame or a data packet in the foregoing step 504, the data frame or the data packet including the MAC address change message may be received in this step. Because the access point needs to perform a further operation according to the MAC address change message, the access point further needs to process the data frame or the data packet including the MAC address change message. For detailed content, reference may be made to a subsequent step.

506. The access point determines, according to the MAC address change message, that the STA has changed the MAC address; and determines that a second MAC connection to the STA has been established by using the second MAC address.

Because there are two manners of sending the MAC address change message by the STA in the foregoing step 504, correspondingly, after the access point receives the MAC address change message sent by the STA, there may be two following manners of processing the MAC address change message:

Processing manner 1: Because the STA modifies the header control information at the MAC layer, that is, adds the MAC address change message to the header control information, the access point needs to modify a previous manner of processing data at the MAC layer, and parses out the MAC address change message in the data frame at the MAC layer according to a modified processing manner. Correspondingly, because the data processing manner at the MAC layer is modified, a manner of processing data at a network layer above the MAC layer also needs to be modified. In addition, because processing data by the access point needs to be managed by an internal management module of the access point, a manner of processing data by the management module also needs to be modified.

Processing manner 2: The protocol content of DHCP is modified, that is, when the IP address is assigned according to DHCP, the MAC address change message is added to the DHCP Discovery message; therefore, when a data packet corresponding to the DHCP Discovery message is encapsulated into a data frame at the MAC layer on the STA end subsequently, encapsulation is performed still in a previous manner, that is, data is normally processed in the previous manner. The access point is generally a device working at the network layer, that is, the access point end is logically divided into only a physical layer, a MAC layer, and a network layer. Therefore, the access point needs to modify only data processing manners of the management module and the highest layer, namely the network layer. In addition, because a processing manner for data encapsulation at the MAC layer is not changed on the STA end, a previous processing manner may still be used to perform processing at the MAC layer of the access point, and the MAC address change message in the DHCP Discovery message is parsed out at the network layer in a modified data processing manner.

It should be noted that, when processing manner 1 is used, data processing manners of the MAC layer, the network layer, and the management module need to be modified. A related modification range is relatively large. If processing manner 2 is used, only the data processing manners of the network layer and the management module need to be modified, and the data processing manner of the MAC layer does not need to be modified. A related modification range is relatively small. However, the protocol content of DHCP needs to be modified in processing manner 2. With reference to the foregoing content, a manner of sending the MAC address change message by the STA may be selected according to an actual situation, and a manner of processing the MAC address change message by the access point is correspondingly selected, so as to meet different requirements, which is not specifically limited in this embodiment.

After obtaining the MAC address change message, the access point can learn, by parsing the MAC address change message, that the associated STA in this case is not a new STA but an STA whose MAC address is changed, and the first MAC connection established in the foregoing step 503 is not a MAC connection established with the new STA but a MAC connection established with the STA whose MAC address is changed. Therefore, the access point may determine the first MAC connection established in the foregoing step 503 as a new MAC connection established with the STA whose MAC address is changed.

It should be noted that, because the STA sends the MAC address change message to the access point in an encryption mode in the foregoing step 504, before parsing the MAC address change message, the access point further needs to decrypt the MAC address change message. A decryption mode may be a decryption mode corresponding to the encryption mode in the foregoing step 504, which is not specifically limited in this embodiment.

In addition, because the MAC address change message carries the second MAC address, the access point can determine, according to the second MAC address, that the second MAC connection to the STA has been established by using the second MAC address. It should be noted that, the foregoing step 504 to this step 506 is a process of negotiating a MAC address change by the STA and the access point. In addition, because an association process is performed first in this embodiment, after the access point and the STA establish the MAC connection, a MAC address of the access point cannot change any more; otherwise, the MAC connection previously established with the STA is caused to be invalid, thereby making the access point fail to communicate with the STA.

After the access point determines, according to the MAC address change message, that the STA has changed the MAC address, and determines that the second MAC connection to the STA has been established by using the second MAC address, the access point learns that the STA has changed the second MAC address to the first MAC address. According to content of this embodiment, the access point does not need to assign a new IP address to the STA. That is, after the access point receives the MAC address change message sent by the STA, the access point does no need to assign a new IP address to the STA according to the DCHP protocol.

507. The access point sends service data of the STA to the STA through the first MAC connection by using a resource related to the second MAC connection.

The service data described herein that is sent through the first MAC connection by using the resource related to the second MAC connection may be service data that is sent through the second MAC connection originally, and now is switched to the first MAC connection for sending.

It can be learned from the foregoing step that, the second MAC connection is equivalent to an old MAC connection, and the first MAC connection is equivalent to a new MAC connection. After the access point determines the first MAC connection as the MAC connection to the STA whose MAC address is changed, the second MAC connection between the access point and the STA before the MAC address is changed is ineffective. In this case, the access point may stop sending service data to the STA through the second MAC connection, and may release the second MAC connection to save a related resource. In addition, the access point may send service data to the STA through the first MAC connection by using the resource related to the second MAC connection, so as to implement service processing.

The service processing mainly refers to data exchange between the STA and the access point. A data exchange process may be determined according to a related protocol used during data transmission, which is not specifically limited in this embodiment. For example, when a user uses the STA to watch a movie, the WMM (Wi-Fi Multimedia) protocol may be used on the STA end and the access point end in this case, and a data exchange process needs to be performed according to a rule of the WMM protocol.

In addition, after the STA changes the MAC address, the MAC address can be tracked. For example, the STA is a mobile phone. A user A uses the mobile phone to watch a movie all the time, that is, the mobile phone obtains data from the access point all the time. A user B monitors mobile phone usage of the user A all the time, and obtains a location of the mobile phone by tracking a MAC address of the mobile phone, so as to track a physical location of the user A. The user B may not know a type of data being received by the mobile phone of the user A, but the user B can determine, according to a transmission status of network data, a data transmission feature of the mobile phone of the user A, such as downlink data when the mobile phone A obtains data related to the movie. If the user A changes the MAC address of the mobile phone, in this case, the user B suddenly finds that the MAC address previously tracked disappears, and a mobile phone with a MAC address different from the previous one obtains data from the access point by means of same downlink data as the previous one. In this case, the user B can easily guess that this mobile phone is still the mobile phone used by the user A but only the MAC address is changed.

Therefore, to avoid that a change of the MAC address of the STA is too easy to recognize, when the MAC address of the STA changes, some additional processing may further be performed to interfere with another person's judgment, so as to conceal the modification to the MAC address of the STA. The additional processing includes but is not limited to: increasing a data transmission rate, reducing a data transmission rate, changing a size of each data packet, disordering a time interval between data packets, changing a modulation scheme of a physical layer, or the like. In addition, a different manner may be used to implement each type of additional processing according to a requirement, which is not specifically limited in this embodiment. For example, a data transmission rate may be reduced or increased by adding or reducing a specific amount of padding data.

508. The STA receives, through the first MAC connection, the service data sent by the access point.

A manner of receiving, by the STA through the first MAC connection, the service data sent by the access point is not specifically limited in this embodiment. For a specific process, reference may be made to a manner of sending the service data by the access point in the foregoing step 507, which is not repeated herein.

In the method provided by this embodiment, after establishing a first MAC connection, an access point and an STA perform MAC address change notification, so that after determining that the access point and the STA have established a second MAC connection, the access point sends service data of the STA to the STA through the first MAC connection by using a resource related to the second MAC connection. Therefore, in a MAC address change process, there is no need to re-establish a resource at an upper layer of a MAC layer, and only a change in invoking a MAC layer resource is required at a layer at which the MAC layer resource is used. Time and a resource for processing a service can be reduced without affecting service continuity and stability of the upper layer. Therefore, the service is processed in a timely manner and service processing efficiency is improved.

Figure 6:
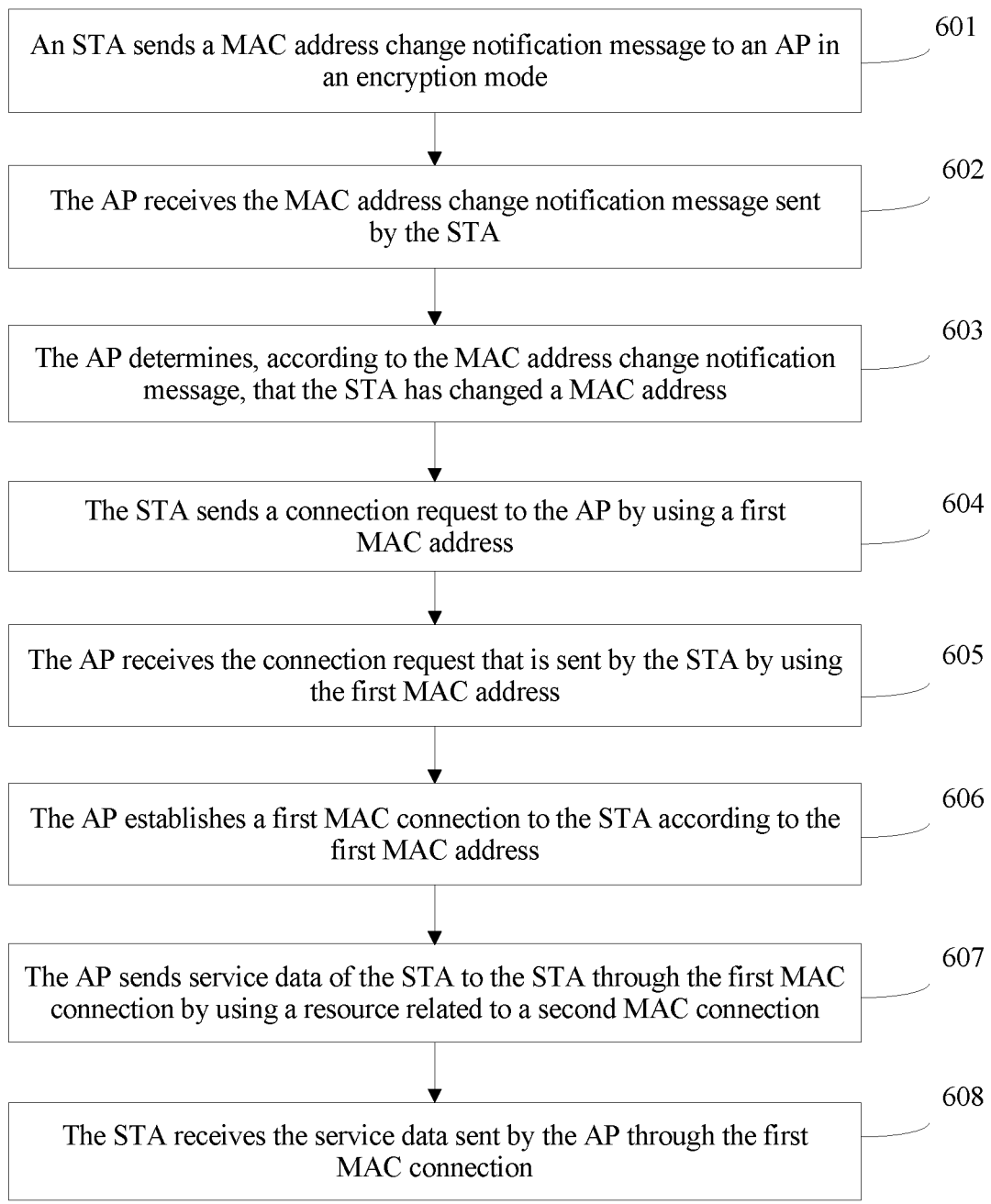
FIG. 6 is a flowchart of a service processing method according to another embodiment of the present invention.

An embodiment of the present invention provides a service processing method, and the method involves an STA and an access point. With reference to content of the foregoing embodiments, in an example of this embodiment, the STA triggers a MAC address change, and the access point and the STA perform MAC address change notification first and then are associated with each other, so as to illustrate the method provided by this embodiment. Referring to FIG. 6, a procedure of the method provided by this embodiment includes the following steps.

601. The STA sends a MAC address change notification message to the access point in an encryption mode.

The MAC address change notification message sent to the access point by the STA in an encryption mode may be a second notification message used to notify the access point that the STA intends to change a MAC address. The STA needs to send the MAC address change notification message to the access point first and then associates with the access point, but a process of assigning an IP address to the STA by the access point according to DHCP is performed after an association step. Therefore, in this embodiment, the STA cannot send the MAC address change notification message when the access point assigns an IP address to the STA according to DHCP, that is, sending manner 2 for the MAC address change message in step 504 in the foregoing embodiment cannot be used for sending the MAC address change message. Therefore, the STA may use sending manner 1 for the MAC address change message in step 504 in the foregoing embodiment to send the MAC address change notification message in a same encryption mode. For a specific process, reference may be made to content of step 504 in the foregoing embodiment, which is not repeated herein. Certainly, the STA may send the MAC address change notification message to the access point in another sending manner and another encryption mode, which is not specifically limited in this embodiment.

It should be noted that, because MAC address change notification is performed first in this embodiment, for the access point, the STA in this step is an STA that has established a second MAC connection. The STA in a subsequent step is also the STA that has established the second MAC connection, which is not specifically limited in this embodiment.

602. The access point receives the MAC address change notification message sent by the STA.

A manner of receiving, by the access point, the MAC address change notification message sent by the STA is not specifically limited in this embodiment. For a specific process, reference may be made to the manner of receiving, by the access point, the MAC address change message sent by the STA in step 505 in the foregoing embodiment, which is not repeated herein.

In addition, after receiving the MAC address change notification message sent by the STA, the access point may return a MAC address change response message to the STA. For a specific process, reference may be made to content of step 505 in the foregoing embodiment, which is not repeated herein.

It should be noted that, because the MAC address change notification message may be sent by being attached to a data frame or a data packet in the foregoing step 601, the data frame or the data packet including the MAC address change notification message may be received in this step, which is not specifically limited in this embodiment. However, because the access point needs to perform a further operation according to the MAC address change notification message, the access point further needs to process the data frame or the data packet including the MAC address change notification message, so as to obtain the MAC address change notification message. For detailed content, reference may be made to a subsequent step.

603. The access point determines, according to the MAC address change notification message, that the STA intends to change a MAC address.

It can be learned from the foregoing step 602 that, because the data frame or the data packet including the MAC address change notification message needs to be processed first to obtain the MAC address change notification message, the access point may process the MAC address change notification message by using a processing manner corresponding to a manner of sending the MAC address change notification message by the STA. A processing manner used by the access point is not specifically limited in this embodiment. For example, when the STA sends the MAC address change notification message in sending manner 1 in step 504 in the foregoing embodiment, correspondingly, the access point may perform processing in processing manner 1 in step 506 in the foregoing embodiment. For a specific process, reference may be made to content of step 506 in the foregoing embodiment, which is not repeated herein.

It should be noted that, in an optional embodiment, after receiving the MAC address change notification message sent by the STA, the access point may further return a MAC address change response message to the STA, where the MAC address change response message indicates that the access point allows the STA to change the MAC address. A form and content of the MAC address change response message returned to the STA by the access point is not specifically limited in this embodiment. A process in which the STA and the access point perform MAC address change notification can be implemented by performing the foregoing step 601 to this step 603.

604. The STA sends a connection request to the access point by using a first MAC address.

A manner of sending the connection request to the access point by the STA by using the first MAC address is not specifically limited in this embodiment. For a specific process, reference may be made to content of step 501 in the foregoing embodiment, which is not repeated herein. It should be noted that, after sending the MAC address change notification message to the access point, the STA may directly use the first MAC address to send the connection request to the access point. Optionally, if the access point returns a MAC address change response message to the STA, that is, the access point and the STA successfully reach a MAC address change negotiation, after receiving the MAC address change response message sent by the access point, the STA may further use the first MAC address to send the connection request to the access point.

605. The access point receives the connection request that is sent by the STA by using the first MAC address.

A manner of receiving, by the access point, the connection request that is sent by the STA by using the first MAC address is not specifically limited in this embodiment. For a specific process, reference may be made to content of step 502 in the foregoing embodiment, which is not repeated herein. The connection request may be an association request, which is not specifically limited in this embodiment.

606. The access point establishes a first MAC connection to the STA according to the first MAC address.

A manner of establishing the first MAC connection to the STA by the access point according to the first MAC address is not specifically limited in this embodiment. For a specific process, reference may be made to content of step 503 in the foregoing embodiment, which is not repeated herein.

It should be noted that, because the access point first receives the MAC address change notification message sent by the STA, when the STA sends an association request to the access point, the access point can determine that the STA initiating the association request this time is an STA with which the access point has been associated, instead of a new STA. After determining that the STA sending the association request this time is not a new STA, the access point can avoid re-assigning a new IP address to the STA when subsequently assigning an IP address according to DHCP, thereby saving time and a resource.

In addition, a MAC address of the access point may change or not change in this embodiment. For example, if the MAC address of the access point changes when the STA sends the MAC address change notification message, the access point may add a new MAC address of the access point to the MAC address change notification message sent to the STA, so that the STA sends an association request to the access point according to the new MAC address of the access point.

607. The access point sends service data of the STA to the STA through the first MAC connection by using a resource related to a second MAC connection.

A manner of sending, by the access point through the first MAC connection by using the resource related to the second MAC connection, the service data of the STA to the STA is not specifically limited in this embodiment. For a specific process, reference may be made to content of step 507 in the foregoing embodiment, which is not repeated herein.

608. The STA receives the service data sent by the access point through the first MAC connection.

A manner of receiving, by the STA, the service data that is sent by the access point through the first MAC connection is not specifically limited in this embodiment. For a specific process, reference may be made to content of step 508 in the foregoing embodiment, which is not repeated herein.

In the method provided by this embodiment, after an access point and an STA, which have established a second MAC connection, first perform MAC address change notification and then establish a first MAC connection, the access point sends service data of the STA to the STA through the first MAC connection by using a resource related to the second MAC connection. Therefore, in a MAC address change process, there is no need to re-establish a resource at an upper layer of a MAC layer, and only a change in invoking a MAC layer resource is required at a layer at which the MAC layer resource is used. Time and a resource for processing a service can be reduced without affecting service continuity and stability of the upper layer. Therefore, the service is processed in a timely manner and service processing efficiency is improved.

Figure 7:
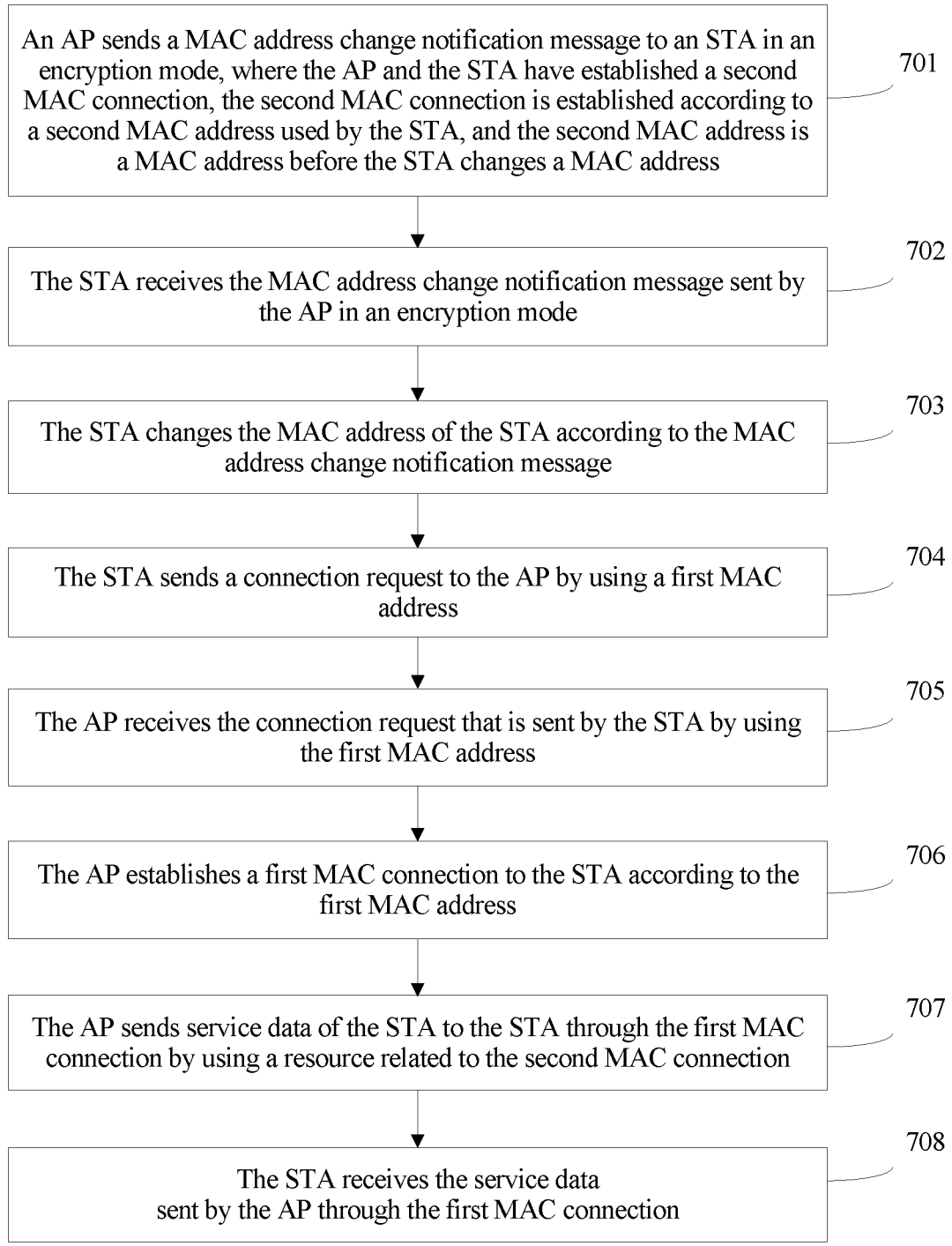
FIG. 7 is a flowchart of a service processing method according to another embodiment of the present invention.

An embodiment of the present invention provides a service processing method, and the method involves an STA and an access point. With reference to content of the foregoing embodiments, in an example of this embodiment, the access point triggers a MAC address change, and the access point and the STA perform MAC address change notification first and then are associated with each other, so as to illustrate the method provided by this embodiment. Referring to FIG. 7, a procedure of the method provided by this embodiment includes the following steps.

701. The access point sends a MAC address change notification message to the STA in an encryption mode, where the access point and the STA have established a second MAC connection, the second MAC connection is established according to a second MAC address used by the STA, and the second MAC address is a MAC address before the STA changes a MAC address.

It can be learned from content of the foregoing embodiments that, the STA initiates a change to a MAC address of itself in all the foregoing embodiments. However, in practice, due to some insecurity factors, a MAC address of the access point needs to be changed, and MAC addresses of all STAs in a network covered by the access point also need to be changed at the same time. Therefore, the access point often needs to trigger the STAs in the network covered by the access point to change respective MAC addresses.

According to the foregoing principle, the access point may send a MAC address change notification message to the STA with which the second MAC connection has been established, which is not specifically limited in this embodiment. The MAC address change notification message sent to the STA by the access point in an encryption mode may be a first notification message used to instruct the STA to change the MAC address, so that the STA changes the MAC address of the STA according to the first notification message. In addition, the access point may send the MAC address change notification message to the STA in an encryption mode, which is not specifically limited in this embodiment. For a specific encryption mode, reference may be made to content of step 504 in the foregoing embodiment, which is not repeated herein.

702. The STA receives the MAC address change notification message that is sent by the access point in an encryption mode.

A manner of receiving, by the STA, the MAC address change notification message that is sent by the access point in an encryption mode is not specifically limited in this embodiment. For a specific process, reference may be made to the manner of receiving, by the access point, the MAC address change message sent by the STA in step 505 in the foregoing embodiment, which is not repeated herein.

In addition, when the STA receives the MAC address change notification message, the STA may send the access point a MAC address change notification reply message used to notify the access point that the MAC address change notification is received, which is not specifically limited in this embodiment. It should be noted that, after receiving the MAC address change notification message, the STA needs to use a decryption mode corresponding to the received information to perform decryption. A decryption mode is not specifically limited in this embodiment.

703. The STA changes the MAC address of the STA according to the MAC address change notification message.

When changing the MAC address of the STA according to the MAC address change notification, the STA may change the MAC address according to a specific field divided for the MAC address, which is not specifically limited in this embodiment. In addition, after the STA changes the MAC address of the STA according to the MAC address change notification message, a changed MAC address of the STA is not limited in this embodiment, and in an example herein, a first MAC address is used as the changed MAC address of the STA.

704. The STA sends a connection request to the access point by using a first MAC address.

A manner of sending the connection request to the access point by the STA by using the first MAC address is not specifically limited in this embodiment. For a specific process, reference may be made to content of step 604 in the foregoing embodiment, which is not repeated herein.

It should be noted that, the foregoing step 701 to step 703 are a process in which the STA and the access point perform MAC address change notification, which is not specifically limited in this embodiment.

705. The access point receives the connection request that is sent by the STA by using the first MAC address.

A manner of receiving, by the access point, the connection request that is sent by the STA by using the first MAC address is not specifically limited in this embodiment. For a specific process, reference may be made to content of step 605 in the foregoing embodiment, which is not repeated herein.

706. The access point establishes a first MAC connection to the STA according to the first MAC address.

A manner of establishing the first MAC connection to the STA by the access point according to the first MAC address is not specifically limited in this embodiment. For a specific process, reference may be made to content of step 606 in the foregoing embodiment, which is not repeated herein.

707. The access point sends service data of the STA to the STA through the first MAC connection by using a resource related to the second MAC connection.

A manner of sending, by the access point through the first MAC connection by using the resource related to the second MAC connection, the service data of the STA to the STA is not specifically limited in this embodiment. For a specific process, reference may be made to content of step 607 in the foregoing embodiment, which is not repeated herein.

708. The STA receives the service data sent by the access point through the first MAC connection.

A manner of receiving, by the STA, the service data that is sent by the access point through the first MAC connection is not specifically limited in this embodiment. For a specific process, reference may be made to content of step 608 in the foregoing embodiment, which is not repeated herein.

In the method provided by this embodiment, after an access point and an STA, which have established a second MAC connection, first perform MAC address change notification and then establish a first MAC connection, the access point sends service data of the STA to the STA through the first MAC connection by using a resource related to the second MAC connection. Therefore, in a MAC address change process, there is no need to re-establish a resource at an upper layer of a MAC layer, and only a change in invoking a MAC layer resource is required at a layer at which the MAC layer resource is used. Time and a resource for processing a service can be reduced without affecting service continuity and stability of the upper layer. Therefore, the service is processed in a timely manner and service processing efficiency is improved.

Figure 8:
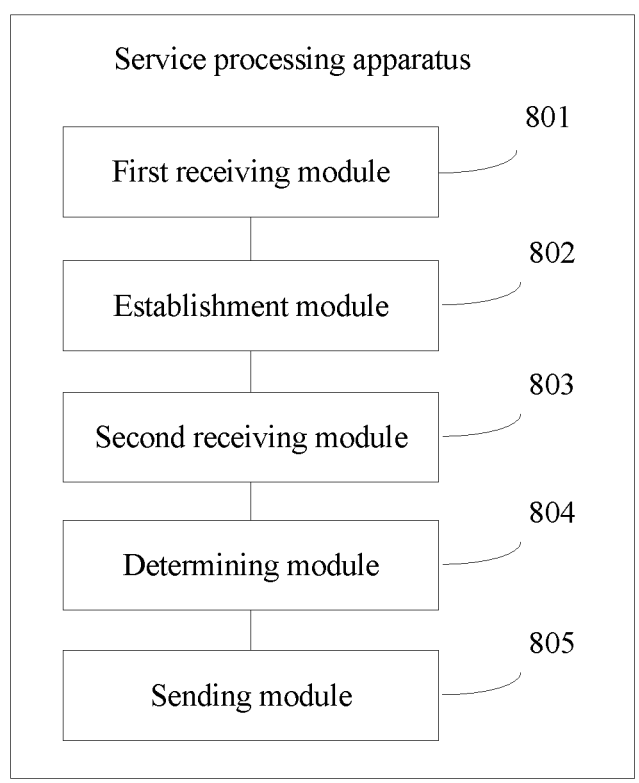
FIG. 8 is a schematic structural diagram of a service processing apparatus according to another embodiment of the present invention.

An embodiment of the present invention provides a service processing apparatus. The apparatus is applied to an access point and is used to perform a function performed by the access point in the service processing method provided by any embodiment in the foregoing embodiments corresponding to FIG. 1, FIG. 3, and FIG. 5. Referring to FIG. 8, the apparatus includes:

a first receiving module 801, configured to receive a connection request that is sent by an STA by using a first MAC address, where the first MAC address is a MAC address after the STA changes a MAC address;

an establishment module 802, configured to establish a first MAC connection to the STA according to the first MAC address;

a second receiving module 803, configured to receive a MAC address change message that is sent by the STA in an encryption mode, where the MAC address change message carries a second MAC address, and the second MAC address is a MAC address before the STA changes the MAC address;

a determining module 804, configured to determine, according to the MAC address change message, that the STA has changed the MAC address; and determine that a second MAC connection to the STA has been established by using the second MAC address; and a sending module 805, configured to send service data of the STA to the STA through the first MAC connection by using a resource related to the second MAC connection.

In an optional embodiment, the apparatus further includes a processing module, configured to: after the second receiving module 803 receives the MAC address change message that is sent by the STA in an encryption mode, assign no new IP address to the STA.

In an optional embodiment, the sending module 805 is specifically configured to send the service data, which is sent to the STA originally through the second MAC connection, to the STA through the first MAC connection by using the resource related to the second MAC connection.

According to the apparatus provided by this embodiment, after establishing a first MAC connection, an access point and an STA perform MAC address change notification, so that after determining that the access point and the STA have established a second MAC connection, the access point sends service data of the STA to the STA through the first MAC connection by using a resource related to the second MAC connection. Therefore, in a MAC address change process, there is no need to re-establish a resource at an upper layer of a MAC layer, and only a change in invoking a MAC layer resource is required at a layer at which the MAC layer resource is used. Time and a resource for processing a service can be reduced without affecting service continuity and stability of the upper layer. Therefore, the service is processed in a timely manner and service processing efficiency is improved.

Figure 9:
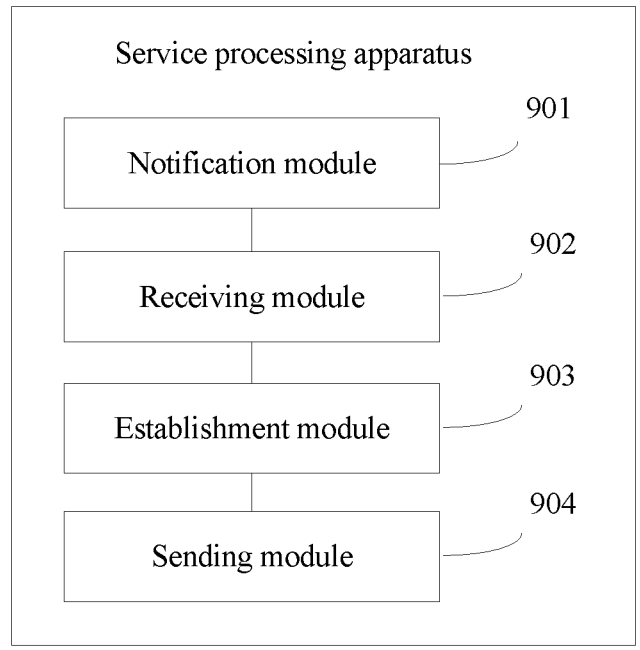
FIG. 9 is a schematic structural diagram of a service processing apparatus according to another embodiment of the present invention.

An embodiment of the present invention provides a service processing apparatus. The apparatus is applied to an access point and is used to perform a function performed by the access point in the service processing method provided by any embodiment in the foregoing embodiments corresponding to FIG. 2, FIG. 4, FIG. 6, and FIG. 7. Referring to FIG. 9, the apparatus includes:

a notification module 901, configured to perform MAC address change notification with an STA in an encryption mode, where the apparatus and the STA have established a second Media Access Control MAC connection, the second MAC connection is established according to a second MAC address used by the STA, and the second MAC address is a MAC address before the STA changes a MAC address;

a receiving module 902, configured to receive a connection request that is sent by the STA by using a first MAC address, where the first MAC address is a MAC address after the STA changes the MAC address;

an establishment module 903, configured to establish a first MAC connection to the STA according to the first MAC address; and a sending module 904, configured to send service data of the STA to the STA through the first MAC connection by using a resource related to the second MAC connection.

In an optional embodiment, the sending module 904 is specifically configured to send the service data, which is sent to the STA originally through the second MAC connection, to the STA through the first MAC connection by using the resource related to the second MAC connection.

In an optional embodiment, the notification module 901 is specifically configured to send, to the STA in an encryption mode, a first notification message used to instruct the STA to change the MAC address, so that the STA changes the MAC address of the STA according to the first notification message.

In an optional embodiment, the notification module 901 is specifically configured to receive a second notification message that is sent by the STA in an encryption mode and used to notify the access point that the STA intends to change the MAC address; and determine, according to the second notification message, that STA intends to change the MAC address.

In an optional embodiment, the apparatus further includes:

a processing module, configured to: after the receiving module 902 receives the connection request that is sent by the STA by using the first MAC address, assign no new IP address to the STA.

According to the apparatus provided by this embodiment, after an access point and an STA, which have established a second MAC connection, first perform MAC address change notification and then establish a first MAC connection, the access point sends service data of the STA to the STA through the first MAC connection by using a resource related to the second MAC connection. Therefore, in a MAC address change process, there is no need to re-establish a resource at an upper layer of a MAC layer, and only a change in invoking a MAC layer resource is required at a layer at which the MAC layer resource is used. Time and a resource for processing a service can be reduced without affecting service continuity and stability of the upper layer. Therefore, the service is processed in a timely manner and service processing efficiency is improved.

Figure 10:
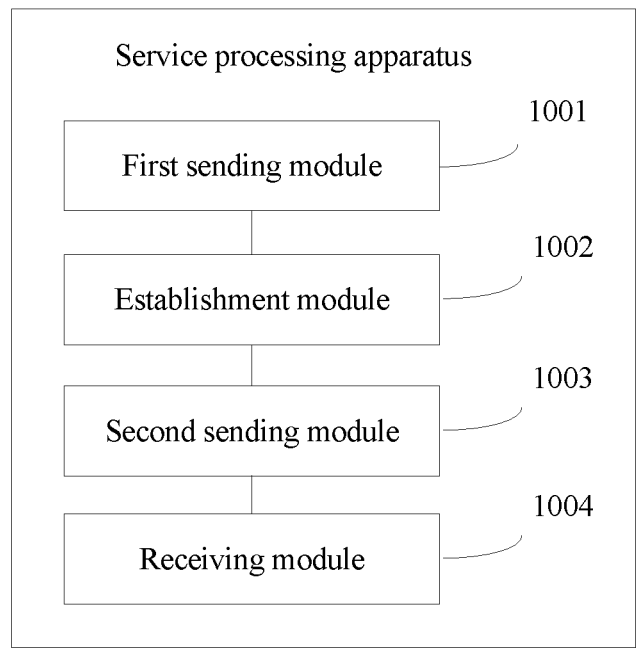
FIG. 10 is a schematic structural diagram of a service processing apparatus according to another embodiment of the present invention.

An embodiment of the present invention provides a service processing apparatus. The apparatus is applied to an STA and is used to perform a function performed by the STA in the service processing method provided by any embodiment in the foregoing embodiments corresponding to FIG. 1, FIG. 3, and FIG. 5. Referring to FIG. 10, the apparatus includes:

a first sending module 1001, configured to send a connection request to an access point by using a first MAC address, where the first MAC address is a MAC address after the apparatus changes a MAC address;

an establishment module 1002, configured to establish a first MAC connection to the access point according to the first MAC address;

a second sending module 1003, configured to send a MAC address change message carrying a second MAC address to the access point in an encryption mode, where the second MAC address is a MAC address before the apparatus changes the MAC address, so that after the access point determines, according to the MAC address change message, that the STA has changed the MAC address, and determines that a second MAC connection to the apparatus has been established by using the second MAC address, the access point sends service data of the apparatus to the apparatus through the first MAC connection by using a resource related to the second MAC connection; and a receiving module 1004, configured to receive, through the first MAC connection, the service data sent by the access point.

According to the apparatus provided by this embodiment, after establishing a first MAC connection, an access point and the apparatus perform MAC address change notification, so that after determining that the access point and the apparatus have established a second MAC connection, the access point sends service data of the apparatus to the apparatus through the first MAC connection by using a resource related to the second MAC connection. Therefore, in a MAC address change process, there is no need to re-establish a resource at an upper layer of a MAC layer, and only a change in invoking a MAC layer resource is required at a layer at which the MAC layer resource is used. Time and a resource for processing a service can be reduced without affecting service continuity and stability of the upper layer. Therefore, the service is processed in a timely manner and service processing efficiency is improved.

Figure 11:
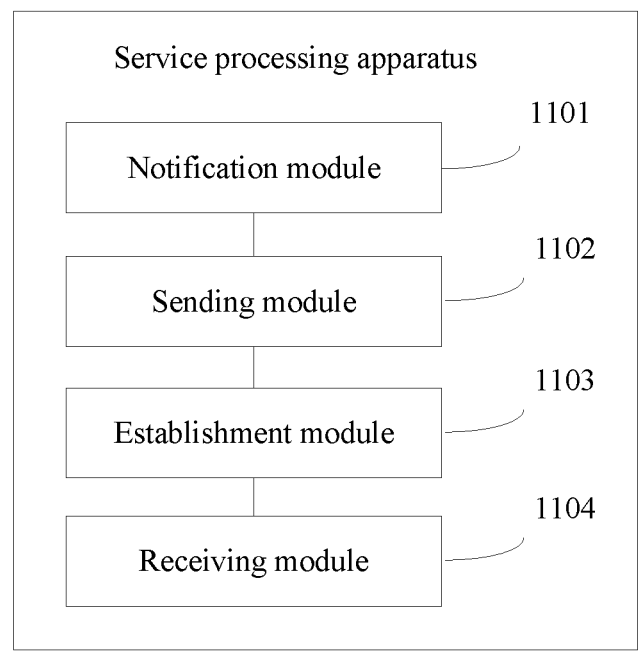
FIG. 11 is a schematic structural diagram of a service processing apparatus according to another embodiment of the present invention.

An embodiment of the present invention provides a service processing apparatus. The apparatus is applied to an STA and is used to perform a function performed by the STA in the service processing method provided by any embodiment in the foregoing embodiments corresponding to FIG. 2, FIG. 4, FIG. 6, and FIG. 7. Referring to FIG. 11, the apparatus includes:

a notification module 1101, configured to perform MAC address change notification with an access point in an encryption mode, where the apparatus and the access point have established a second MAC connection, the second MAC connection is established according to a second MAC address used by the STA, and the second MAC address is a MAC address before the apparatus changes a MAC address;

a sending module 1102, configured to send a connection request to the access point by using a first MAC address, where the first MAC address is a MAC address after the apparatus changes the MAC address;

an establishment module 1103, configured to establish a first MAC connection to the access point according to the first MAC address, so that the access point sends service data of the apparatus to the apparatus through the first MAC connection by using a resource related to the second MAC connection; and a receiving module 1104, configured to receive, through the first MAC connection, the service data sent by the access point.

In an optional embodiment, the notification module 1101 is specifically configured to receive a first notification message that is sent by the access point in an encryption mode, where the first notification message is used to instruct the apparatus to change the MAC address; and change the MAC address of the apparatus according to the first notification message.

In an optional embodiment, the notification module 1101 is specifically configured to send a second notification message to the access point in an encryption mode, where the second notification message is used to notify the access point that the apparatus intends to change the MAC address, so that the access point determines, according to the second notification message, that the apparatus intends to change the MAC address.

According to the apparatus provided by this embodiment, after an access point and the apparatus first perform MAC address change notification and then establish a first MAC connection, the access point sends service data of the apparatus to the apparatus through the first MAC connection by using a resource related to a second MAC connection. Therefore, in a MAC address change process, there is no need to re-establish a resource at an upper layer of a MAC layer, and only a change in invoking a MAC layer resource is required at a layer at which the MAC layer resource is used. Time and a resource for processing a service can be reduced without affecting service continuity and stability of the upper layer. Therefore, the service is processed in a timely manner and service processing efficiency is improved.

Figure 12:
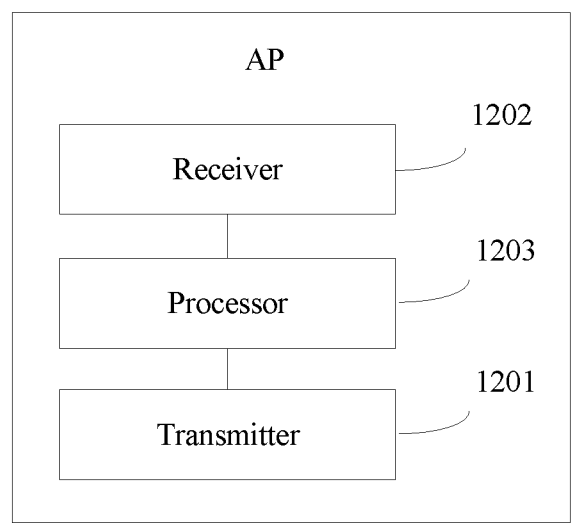
FIG. 12 is a schematic structural diagram of an access point according to another embodiment of the present invention.

An embodiment of the present invention provides an access point. The access point is used to perform a function performed by the access point in the service processing method provided by any embodiment in the foregoing embodiments corresponding to FIG. 1, FIG. 3, and FIG. 5. Referring to FIG. 12, the access point includes a transmitter 1201, a receiver 1202, and a processor 1203 (there may be one or more processors, and one processor is used as an example in this embodiment; reference may be made to description herein for understanding a place of another embodiment in which a processor is involved).

The receiver 1202 is configured to receive a connection request that is sent by an STA by using a first MAC address, where the first MAC address is a MAC address after the STA changes a MAC address.

The processor 1203 is configured to establish a first MAC connection to the STA according to the first MAC address.

The receiver 1202 is further configured to receive a MAC address change message that is sent by the STA in an encryption mode, where the MAC address change message carries a second MAC address, and the second MAC address is a MAC address before the STA changes the MAC address.

The processor 1203 is further configured to determine, according to the MAC address change message, that the STA has changed the MAC address; and determine that a second MAC connection to the STA has been established by using the second MAC address.

The transmitter 1201 is configured to send service data of the STA to the STA through the first MAC connection by using a resource related to the second MAC connection.

In an optional embodiment, after the receiver 1202 receives the MAC address change message that is sent by the STA in an encryption mode, the processor 1203 assigns no new IP address to the STA.

In an optional embodiment, the transmitter 1201 is specifically configured to send the service data, which is sent to the STA originally through the second MAC connection, to the STA through the first MAC connection by using the resource related to the second MAC connection.

According to the device provided by this embodiment of the present invention, after establishing a first MAC connection, the access point and an STA perform MAC address change notification, so that after determining that the access point and the STA have established a second MAC connection, the access point sends service data of the STA to the STA through the first MAC connection by using a resource related to the second MAC connection. Therefore, in a MAC address change process, there is no need to re-establish a resource at an upper layer of a MAC layer, and only a change in invoking a MAC layer resource is required at a layer at which the MAC layer resource is used. Time and a resource for processing a service can be reduced without affecting service continuity and stability of the upper layer. Therefore, the service is processed in a timely manner and service processing efficiency is improved.

Figure 13:
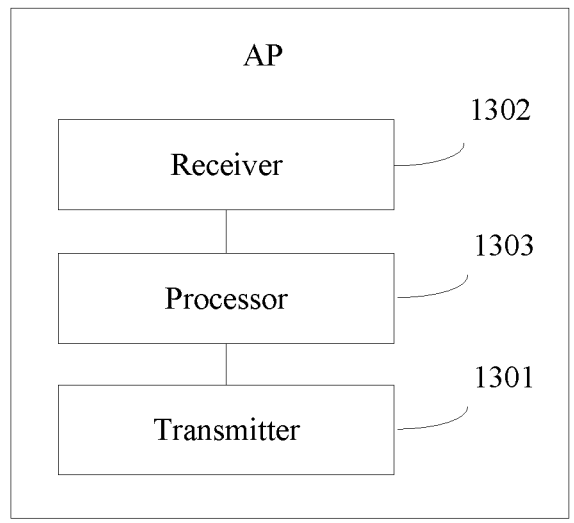
FIG. 13 is a schematic structural diagram of an access point according to another embodiment of the present invention.

An embodiment of the present invention provides an access point. The access point is used to perform a function performed by the access point in the service processing method provided by any embodiment in the foregoing embodiments corresponding to FIG. 2, FIG. 4, FIG. 6, and FIG. 7. Referring to FIG. 13, the access point includes a transmitter 1301, a receiver 1302, and a processor 1303.

The processor 1303 is configured to perform MAC address change notification with an STA in an encryption mode, where the access point and the STA have established a second Media Access Control MAC connection, the second MAC connection is established according to a second MAC address used by the STA, and the second MAC address is a MAC address before the STA changes a MAC address.

The receiver 1302 is configured to receive a connection request that is sent by the STA by using a first MAC address, where the first MAC address is a MAC address after the STA changes the MAC address.

The processor 1303 is further configured to establish a first MAC connection to the STA according to the first MAC address.

The transmitter 1301 is configured to send service data of the STA to the STA through the first MAC connection by using a resource related to the second MAC connection.

In an optional embodiment, the transmitter 1301 is specifically configured to send the service data, which is sent to the STA originally through the second MAC connection, to the STA through the first MAC connection by using the resource related to the second MAC connection.

In an optional embodiment, that the processor 1303 is configured to perform MAC address change notification with an STA in an encryption mode is specifically that the processor is configured to send, to the STA in an encryption mode, a first notification message used to instruct the STA to change the MAC address, so that the STA changes the MAC address of the STA according to the first notification message.

In an optional embodiment, that the processor 1303 is configured to perform MAC address change notification with an STA in an encryption mode is specifically that the processor 1303 is configured to receive a second notification message that is sent by the STA in an encryption mode and used to notify the access point that the STA intends to change the MAC address; and determine, according to the second notification message, that the STA intends to change the MAC address.

In an optional embodiment, after the receiver 1302 receives the connection request that is sent by the STA by using the first MAC address, the processor 1303 assigns no new IP address to the STA.

According to the device provided by this embodiment of the present invention, after the access point and an STA first perform MAC address change notification and then establish a first MAC connection, the access point sends service data of the STA to the STA through the first MAC connection by using a resource related to a second MAC connection. Therefore, in a MAC address change process, there is no need to re-establish a resource at an upper layer of a MAC layer, and only a change in invoking a MAC layer resource is required at a layer at which the MAC layer resource is used. Time and a resource for processing a service can be reduced without affecting service continuity and stability of the upper layer. Therefore, the service is processed in a timely manner and service processing efficiency is improved.

Figure 14:
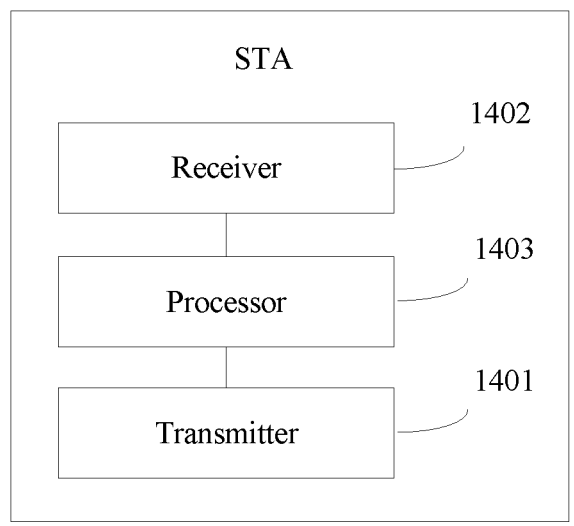
FIG. 14 is a schematic structural diagram of an STA according to another embodiment of the present invention.

An embodiment of the present invention provides an STA. The STA is used to perform a function performed by the STA in the service processing method provided by any embodiment in the foregoing embodiments corresponding to FIG. 1, FIG. 3, and FIG. 5. Referring to FIG. 14, the STA includes a transmitter 1401, a receiver 1402, and a processor 1403.

The transmitter 1401 is configured to send a connection request to an access point by using a first MAC address, where the first MAC address is a MAC address after the STA changes a MAC address.

The processor 1403 is configured to establish a first MAC connection to the access point according to the first MAC address.

The transmitter 1401 is further configured to send a MAC address change message carrying a second MAC address to the access point in an encryption mode, where the second MAC address is a MAC address before the STA changes the MAC address, so that after the access point determines, according to the MAC address change message, that the STA has changed the MAC address, and determines that a second MAC connection to the STA has been established by using the second MAC address, the access point sends service data of the STA to the STA through the first MAC connection by using a resource related to the second MAC connection.

The receiver 1402 is configured to receive, through the first MAC connection, the service data sent by the access point.

According to the device provided by this embodiment of the present invention, after establishing a first MAC connection, an access point and the STA perform MAC address change notification, so that after determining that the access point and the STA have established a second MAC connection, the access point sends service data of the STA to the STA through the first MAC connection by using a resource related to the second MAC connection. Therefore, in a MAC address change process, there is no need to re-establish a resource at an upper layer of a MAC layer, and only a change in invoking a MAC layer resource is required at a layer at which the MAC layer resource is used. Time and a resource for processing a service can be reduced without affecting service continuity and stability of the upper layer. Therefore, the service is processed in a timely manner and service processing efficiency is improved.

Figure 15:
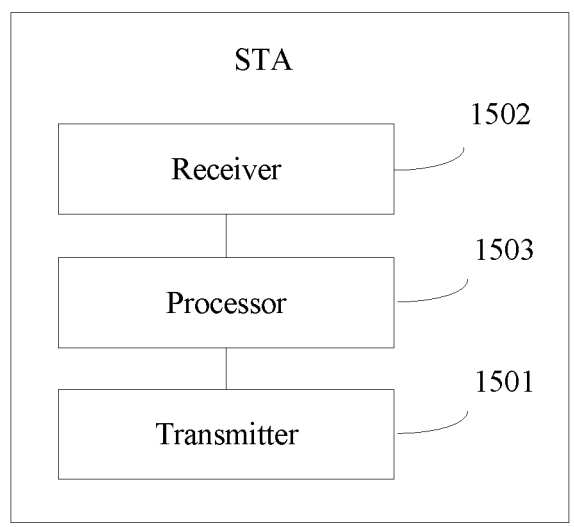
FIG. 15 is a schematic structural diagram of an STA according to another embodiment of the present invention.

An embodiment of the present invention provides an STA. The STA is used to perform a function performed by the STA in the service processing method provided by any embodiment in the foregoing embodiments corresponding to FIG. 2, FIG. 4, FIG. 6, and FIG. 7. Referring to FIG. 15, the STA includes a transmitter 1501, a receiver 1502, and a processor 1503.

The processor 1503 is configured to perform MAC address change notification with an access point in an encryption mode, where the access point and the STA have established a second MAC connection, the second MAC connection is established according to a second MAC address used by the STA, and the second MAC address is a MAC address before the STA changes a MAC address.

The transmitter 1501 is configured to send a connection request to the access point by using a first MAC address, where the first MAC address is a MAC address after the STA changes the MAC address.

The processor 1503 is further configured to establish a first MAC connection to the access point according to the first MAC address, so that the access point sends service data of the STA to the STA through the first MAC connection by using a resource related to the second MAC connection.

The receiver 1502 is configured to receive, through the first MAC connection, the service data sent by the access point.

In an optional embodiment, the receiver 1502 is specifically configured to receive a first notification message that is sent by the access point in an encryption mode, where the first notification message is used to instruct the STA to change the MAC address.

The processor 1503 is specifically configured to change the MAC address of the STA according to the first notification message.

In an optional embodiment, the transmitter 1501 is specifically configured to send a second notification message to the access point in an encryption mode, where the second notification message is used to notify the access point that the STA intends to change the MAC address, so that the access point determines, according to a MAC address change notification message, that the STA intends to change the MAC address.

According to the device provided by this embodiment, after an access point and the STA, which have established a second MAC connection, first perform MAC address change notification and then establish a first MAC connection, the access point sends service data of the STA to the STA through the first MAC connection by using a resource related to the second MAC connection. Therefore, in a MAC address change process, there is no need to re-establish a resource at an upper layer of a MAC layer, and only a change in invoking a MAC layer resource is required at a layer at which the MAC layer resource is used. Time and a resource for processing a service can be reduced without affecting service continuity and stability of the upper layer. Therefore, the service is processed in a timely manner and service processing efficiency is improved.

It should be noted that, when the service processing apparatus provided by the foregoing embodiment processes a service, division of the foregoing function modules is merely used as an example for description. In practice, the foregoing functions may be allocated to different function modules for implementation as required, that is, an internal structure of the apparatus is divided into different function modules, so as to implement all or a part of the functions described above. In addition, the service processing apparatus, the access point, and the STA in the foregoing embodiments and the service processing method embodiment belong to a same conception. For a specific implementation process thereof, reference may be made to the method embodiments, which is not repeated herein.

The sequence numbers of the foregoing embodiments of the present invention are merely for illustrative purposes, and are not intended to indicate priorities of the embodiments.

The message names used in the embodiments of the present invention are not limited to the given names. Any message that has a same or similar function is applicable.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely example embodiments of the present invention, but are not intended to limit the present invention. Any modification, equivalent replacement, and improvement made without departing from the spirit and principle of the present invention shall fall within the protection scope of the present invention. Additionally, statements made herein characterizing the invention refer to an embodiment of the invention and not necessarily all embodiments.

What is claimed is:

1. A service processing method, wherein the service processing method comprises:
   receiving, by an access point, a connection request that is sent by a station (STA) by using a first media access control (MAC) address, and establishing a first MAC connection to the STA according to the first MAC address, wherein the first MAC address is the MAC address of the STA after the STA changes its MAC address from a second MAC address to the first MAC address;
   receiving, by the access point, a MAC address change message that is sent by the STA in an encryption mode, wherein the MAC address change message carries the second MAC address, and determining that a second MAC connection to the STA has previously been established by using the second MAC address; and
   completing a MAC address changeover with respect to the STA changing from the second MAC address to the first MAC address without re-establishing a resource at an upper layer of a MAC layer by sending, by the access point, service data of the STA to the STA through the first MAC connection by using a resource related to the second MAC connection.

2. The service processing method according to claim 1, wherein after receiving the MAC address change message, no new Internet Protocol (IP) address is assigned to the STA.

3. The service processing method according to claim 1, wherein sending the service data of the STA to the STA through the first MAC connection by using the resource related to the second MAC connection further comprises:
   sending the service data of the STA, which was previously sent to the STA through the second MAC connection, to the STA through the first MAC connection by using the resource related to the second MAC connection.

4. A service processing method, wherein the service processing method comprises:
   performing, by an access point, media access control (MAC) address change notification with a station (STA) in an encryption mode, wherein the access point and the STA have established a second MAC connection, the second MAC connection is established according to a second MAC address used by the STA, and the second MAC address is the MAC address of the STA before the STA changes its MAC address from the second MAC address to a first MAC address;
   receiving, by the access point, a connection request that is sent by the STA by using the first MAC address;
   establishing, by the access point, a first MAC connection to the STA according to the first MAC address; and
   completing a MAC address changeover with respect to the STA changing from the second MAC address to the first MAC address without re-establishing a resource at an upper layer of a MAC layer by sending, by the access point, service data of the STA to the STA through the first MAC connection by using a resource related to the second MAC connection.

5. The service processing method according to claim 4, wherein sending the service data of the STA to the STA through the first MAC connection by using a resource related to the second MAC connection further comprises:
   sending the service data of the STA, which was previously sent to the STA through the second MAC connection, to the STA through the first MAC connection by using the resource related to the second MAC connection.

6. The service processing method according to claim 4, wherein performing the MAC address change notification in the encryption mode further comprises:
   sending, by the access point to the STA in an encryption mode, a notification message for instructing the STA to change its MAC address.

7. The service processing method according to claim 4, wherein performing the MAC address change notification in the encryption mode further comprises:
   receiving, by the access point, a notification message from the STA for notifying the access point that the STA intends to change its MAC address, and determining, according to the notification message, that the STA intends to change its MAC address.

8. The service processing method according to claim 4, wherein after the connection request that is sent by the STA by using the first MAC address is received, no new Internet Protocol (IP) address is assigned to the STA.

9. A device, wherein the device comprises:
a processor, configured to perform media access control (MAC) address change notification with a station (STA) in an encryption mode, wherein the device and the STA have established a second MAC connection, the second MAC connection is established according to a second MAC address used by the STA, and the second MAC address is the MAC address of the STA before the STA changes its MAC address from the second MAC address to a first MAC address; and
a receiver, configured to receive a connection request that is sent by the STA by using the first MAC address;
wherein the processor is further configured to establish a first MAC connection to the STA according to the first MAC address;
wherein the device further comprises a transmitter, configured to send service data of the STA to the STA through the first MAC connection by using a resource related to the second MAC connection, so as to complete a MAC address changeover with respect to the STA changing from the second MAC address to the first MAC address without re-establishing a resource at an upper layer of a MAC layer by.

10. The device according to claim 9, wherein sending the service data of the STA to the STA through the first MAC connection by using a resource related to the second MAC connection further comprises:
sending the service data of the STA, which was previously sent to the STA through the second MAC connection, to the STA through the first MAC connection by using the resource related to the second MAC connection.

11. The device according to claim 9, wherein performing the MAC address change notification in the encryption mode further comprises:
sending, to the STA in an encryption mode, a notification message for instructing the STA to change its MAC address.

12. The device according to claim 9, wherein performing the MAC address change notification in the encryption mode further comprises:
receiving a notification message for notifying the device that the STA intends to change its MAC address; and
determining, according to the notification message, that the STA intends to change its MAC address.

13. The device according to claim 9, wherein the processor is further configured not to assign a new Internet Protocol (IP) address to the STA after the receiver receives the connection request that is sent by the STA by using the first MAC address.

* * * * *